United States Patent
Hwang et al.

(10) Patent No.: US 10,395,098 B2
(45) Date of Patent: Aug. 27, 2019

(54) METHOD OF EXTRACTING FEATURE OF IMAGE TO RECOGNIZE OBJECT

(71) Applicant: Samsung Electronics Co., Ltd., Suwon-si, Gyeonggi-do (KR)

(72) Inventors: Wonjun Hwang, Seoul (KR); Sungjoo Suh, Seoul (KR); Jaejoon Han, Seoul (KR); Chang Kyu Choi, Seongnam-si (KR); Yun Fu, Boston, MA (US); Zhengming Ding, Boston, MA (US); Ming Shao, Boston, MA (US)

(73) Assignees: SAMSUNG ELECTRONICS CO., LTD., Gyeonggi-Do (KR); NORTHEASTERN UNIVERSITY, Boston, MA (US)

( * ) Notice: Subject to any disclaimer, the term of this patent is extended or adjusted under 35 U.S.C. 154(b) by 0 days.

(21) Appl. No.: 15/268,988

(22) Filed: Sep. 19, 2016

(65) Prior Publication Data
US 2017/0236000 A1    Aug. 17, 2017

(30) Foreign Application Priority Data

Feb. 16, 2016 (KR) .......................... 10-2016-0017934

(51) Int. Cl.
*G06K 9/62* (2006.01)
*G06K 9/00* (2006.01)

(52) U.S. Cl.
CPC ..... *G06K 9/00268* (2013.01); *G06K 9/00228* (2013.01); *G06K 9/00288* (2013.01);
(Continued)

(58) Field of Classification Search
CPC .......... G06K 9/00268; G06K 9/00275; G06K 9/00281; G06K 9/00228; G06K 9/00234;
(Continued)

(56) References Cited

U.S. PATENT DOCUMENTS

| 7,054,468 B2 * | 5/2006 | Yang .................. G06K 9/00275 345/16 |
| 7,734,087 B2 | 6/2010 | Hwang et al. |

(Continued)

FOREIGN PATENT DOCUMENTS

| JP | 5777380 B2 | 9/2015 |
| JP | 2015225410 A | 12/2015 |

(Continued)

OTHER PUBLICATIONS

Weinberger et al., "Distance Metric Learning for Large Margin Nearest Neighbor Classification," Journal of Machine Learning Research, 2009, p. 207-244, vol. 10, Kilian Q. Weinberger and Lawrence Saul.

(Continued)

*Primary Examiner* — Dwayne D Bost
*Assistant Examiner* — Stephen M Brinich
(74) *Attorney, Agent, or Firm* — Harness, Dickey & Pierce, P.L.C.

(57) ABSTRACT

A method of converting a vector corresponding to an input image includes receiving input vector data associated with an input image including an object; and converting the received input vector data into feature data based on a projection matrix having a fixed rank, wherein a first dimension of the input vector data is higher than a second dimension of the feature data.

19 Claims, 13 Drawing Sheets

(52) U.S. Cl.
CPC ......... *G06K 9/6215* (2013.01); *G06K 9/6234* (2013.01); *G06K 9/6269* (2013.01); *G06K 9/00275* (2013.01)

(58) Field of Classification Search
CPC ........... G06K 9/00241; G06K 9/00248; G06K 9/00255; G06K 9/00261; G06K 9/00266; G06K 9/00302; G06K 9/00308; G06K 9/00315; G06K 9/00288; G06K 9/00295; G06K 9/6215; G06K 9/6214; G06K 2009/6213; G06K 9/6212; G06K 9/6211; G06K 9/621; G06K 9/6269; G06K 9/6268; G06K 9/6267; G06K 9/627
USPC ....... 382/103, 149, 195–197, 205, 232, 236, 382/253
See application file for complete search history.

(56) References Cited

U.S. PATENT DOCUMENTS

| | | | |
|---|---|---|---|
| 8,515,180 B2 * | 8/2013 | Kato | G06K 9/00281 382/195 |
| 8,837,786 B2 | 9/2014 | Hwang et al. | |
| 9,129,149 B2 * | 9/2015 | Kameyama | G06K 9/00275 |
| 2008/0279424 A1 * | 11/2008 | Berrani | G06K 9/00288 382/118 |
| 2011/0091113 A1 * | 4/2011 | Ito | G06K 9/00248 382/197 |
| 2013/0336588 A1 * | 12/2013 | Rane | G06K 9/6239 382/197 |
| 2013/0342681 A1 * | 12/2013 | Duong | G06K 9/00986 348/135 |
| 2015/0317511 A1 | 11/2015 | Li et al. | |
| 2016/0086047 A1 | 3/2016 | Suh et al. | |

FOREIGN PATENT DOCUMENTS

| | | |
|---|---|---|
| KR | 100548211 B1 | 2/2006 |
| KR | 101481225 B1 | 1/2015 |
| KR | 20150047408 A | 5/2015 |

OTHER PUBLICATIONS

Shen et al., "A Unified Approach to Salient Object Detection via Low Rank Matrix Recovery," Computer Vision and Pattern Recognition (CVPR), 2012 IEEE Conference.

Guillaumin et al., "Is that you? Metric Learning Approaches for Face Identification," Computer Vision, 2009 IEEE 12 International Conference.

\* cited by examiner

METHOD OF EXTRACTING FEATURE OF IMAGE TO RECOGNIZE OBJECT

CROSS-REFERENCE TO RELATED APPLICATION

This application claims under 35 U.S.C. § 119 to Korean Patent Application No. 10-2016-0017934, filed on Feb. 16, 2016, in the Korean Intellectual Property Office, the entire contents of which are incorporated herein by reference in their entirety.

BACKGROUND

1. Field

At least one example embodiment relates to a method and apparatus for low-dimensionally extracting features of an object from an image.

2. Description of the Related Art

A human face is a significant factor for visual discrimination and identification in image processing and interpretation. Since the early 1990s, analyses of facial expression interpretation and face recognition have been extensively developed.

Recently, moving picture experts group (MPEG)-7 face descriptors have been suggested for face search and identification in a flow of images. Contrary to existing face recognition algorithms, a major function of the face descriptors is to find face images identical to a search image as fast and effectively as possible.

Face recognition is technology that verifies an identity with respect to a face of at least one person in a still image or a video using a provided face database.

Unlike other biometrics such as fingerprint recognition, face recognition does not require a body part to directly touch a recognizes with, and obtains biometric information less forcibly. However, since a face changes dramatically as illumination and a pose or posture change, and is overly sensitive to a surrounding environment, face recognition has a relative low recognition rate when compared to other biometrics technologies.

SUMMARY

At least some example embodiments relate to a method of converting a vector corresponding to an input image.

In at least some example embodiments, the method may include receiving input vector data associated with an input image including an object, and converting the received input vector data into feature data based on a projection matrix having a fixed rank. A first dimension of the input vector data may be higher than a second dimension of the feature data.

The converting may include subtracting average vector data from the input vector data, and applying the projection matrix having the fixed rank to the average vector data-subtracted input vector data.

The projection ma ay be pre-generated based on a covariance matrix corresponding to training vector data and a dictionary which is a set of elements constituting an object in an image.

The projection matrix may be generated such that feature data obtained by reflecting the projection matrix in the input vector data is to be the same as vector data obtained by adding a sparse error matrix to a product of a coefficient matrix and a dictionary which is a set of elements constituting an object in an image.

The projection matrix may be generated based on metric calculation using a covariance matrix and a rank of the coefficient matrix.

The receiving may include receiving first image vector data associated with a first image and second image vector data associated with at least one second image, the converting may include converting the first image vector data and the second image vector data into second dimensional first image vector data and second dimensional second image vector data based on the projection matrix. The method may further include comparing the first image and each of the at least one second image based on the second dimensional first image vector data and the second dimensional second image vector data.

The receiving may include receiving the input image, detecting an object area including the object from the input image, and extracting the input vector data from the input image.

The method may include calculating a similarity by comparing the feature data to feature data obtained by converting input vector data extracted from another image, and determining that the object included in the input image is the same as an object included in the other image when the similarity is greater than a preset threshold similarity.

The method may further include calculating a similarity by comparing the feature data to pre-stored feature data corresponding to a plurality of objects, and determining that the object included in the input image is the same as an object corresponding to feature data having a similarity greater than a preset threshold similarity, among the pre-stored feature data.

Other example embodiments relate to a method of learning a projection matrix to convert a dimension of vector data associated with an input image.

In some example embodiments, the method may include receiving training data sets corresponding to a plurality of training images, respectively, and jointly learning a projection matrix having a fixed rank and a dictionary which is a set of elements constituting an object in an image, based on the training data sets.

The learning may include maintaining a rank of the projection matrix to be the fixed rank.

The learning may include pre-generating the projection matrix based on a covariance matrix corresponding to training vector data.

The learning may include determining the projection matrix such that a difference between elements corresponding to the same object is to be minimized and a difference between elements corresponding to different objects is to be maximized or, alternatively, set to a desired level in training vector data.

The learning may include determining the projection matrix such that vector data obtained by reflecting the projection matrix in input vector data corresponding to an input image is to be the same as vector data obtained by adding a sparse error matrix to a product of a coefficient matrix and the dictionary.

The learning may include determining the projection matrix based on metric calculation using a covariance matrix and a rank of the coefficient matrix.

The learning may include generating a convergent projection matrix and a convergent dictionary by iteratively calculating the projection matrix and the dictionary.

Other example embodiments relate to a method of recognizing an image.

In some example embodiments, the method may include extracting input vector data from an input image, converting the input vector data into input feature data based on a first projection matrix having a fixed rank, generating a training data set including the input vector data based on the input feature data, learning a second projection matrix and a dictionary based on the generated training data set, and correcting the first projection matrix based on the second projection matrix.

The learning may include calculating a coefficient matrix and the second projection matrix based on the training data set, calculating the dictionary based on the second projection matrix and the coefficient matrix, and iteratively calculating the second projection matrix and the dictionary until the second projection matrix and the dictionary converge.

The generating may include mapping a label corresponding to registered feature data stored in a database to the input vector data when a similarity between the input feature data and the registered feature data is greater than or equal to a threshold similarity, and generating a training data set including the input vector data to which the label is mapped.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
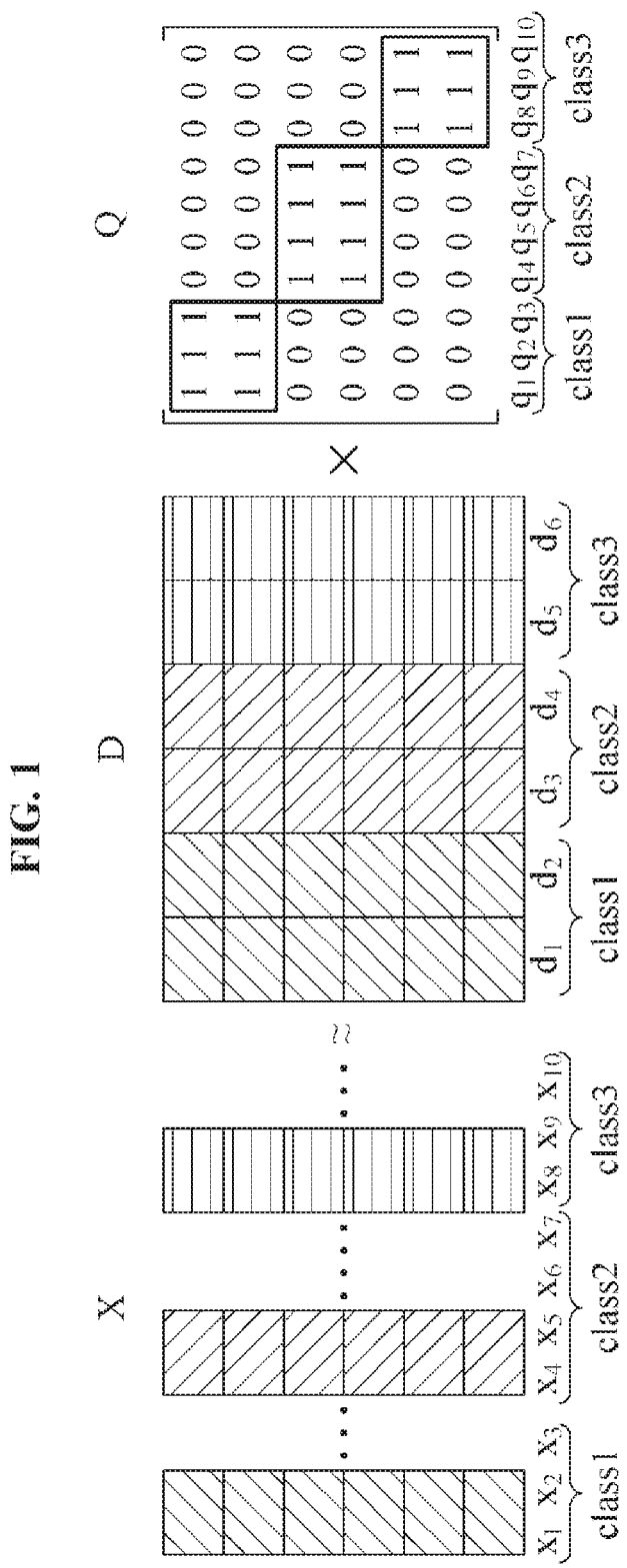
FIG. 1 illustrates vector data corresponding to images classified by classes according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, vector data may refer to data in a form of vectors. For example, the vector data may be column vectors. For example, an element of the vector data may be a real number. However, the element of the vector data is not limited thereto. A binary number or an integer may be used, as necessary.

Further, an input image is an image input into an apparatus. The input image may be received in a form of vector data. For example, the input image may be a video or a still image. In a case in which the input image is a video including a plurality of frames, a single item of vector data may correspond to a single frame. In a case in which the input image is a still image, a single item of vector data may correspond to the input image.

Here, the input image may include an object. For example, the object may include a person, a thing, and an animal. Further, the object may include a face, a whole body, and a hand of a human.

A plurality of input images may each include an image including the same object or different objects. Here, a portion of a plurality of input images including the same object may include images other than remaining input images including the same object. For example, an object of the portion of the plurality of input images including the same object may have a pose, an angle, and a position differing from those of an object of the remaining input images.

The plurality of input images may be classified by a class corresponding to the same object. For example, a single class may include at least one of a set of vector data or a set of input images corresponding to the same object. Here, the number of classes may correspond to the number of objects.

FIG. 1 illustrates vector data corresponding to images classified by classes according to at least one example embodiment.

In FIG. 1, a plurality of input images X may be a set of vector data. In a case in which N input images are provided, the plurality of input images may be expressed as $X=[x_1, x_2, \ldots, x_N]$. Here, N may be an integer greater than or equal to "1". $x_1, x_2, \ldots,$ and $x_N$ may each be vector data corresponding to a single input image.

A dictionary D may be a set of vectors that linearly represent a data space. The dictionary D may include a sub-dictionary to represent a data space corresponding to each class. For example, in a case in which M sub-dictionaries are provided, the dictionary D may be expressed as $D=[d_1, d_2, \ldots, d_M]$. Here, M may be an integer greater than or equal to "1". $d_1, d_2, \ldots,$ and $d_M$ may each be a sub-dictionary to represent each class, and may be learned with respect to each class. The number M of the sub-dictionaries may be determined to be a number optimized to represent the entire data space or, alternatively, a number set to a desired level for representing the entire data space.

The dictionary D may be a set of elements which are minimum or, alternatively, desired units constituting an object in an image. The elements may be, for example, edges in an image, and the object may be, for example, a face or a thing. The aforementioned sub-dictionaries $d_1, d_2, \ldots,$ and $d_M$ may correspond to the elements constituting the object. For example, in face recognition, the dictionary D may be a set of visual words constituting a face. The visual words of the face may be minimum or, alternatively, desired units constituting the face. A visual word may be a patch of an image including information associated with features of an object included in the image, in a feature space. A process of learning the dictionary D and a process of learning the projection matrix P using the learned dictionary D will be described in detail with reference to FIGS. 5 through 11.

An ideal representation Q may be a set of coefficients to represent vector data corresponding to the input images X from the dictionary D. The ideal representation Q may be expressed as $Q=[q_1, q_2, q_3, \ldots, q_N]$. $q_1, q_2, q_3, \ldots,$ and $q_N$ may each be a column vector of coefficients to represent the vector data $x_1, x_2, \ldots, x_N$ corresponding to the input images from the dictionary D. For example, a matrix product of the dictionary D and the ideal representation Q may be vector data corresponding to the input images X.

For example, in FIG. 1, it may be assumed that the number of vector data included in the input images X is "10", a class 1 includes $x_1, x_2,$ and $x_3$, a class 2 includes $x_4, x_5, x_6,$ and $x_7$, and a class 3 includes $x_8, x_9,$ and $x_{10}$. Here, the class 1, the class 2, and the class 3 may correspond to different objects, respectively. The input images X of FIG. 1 may be decomposed to a matrix product of the dictionary D and the ideal representation Q. However, the number of classes and the number of vector data are not limited thereto, and may vary in an example.

In this example, the number of sub-dictionaries, for example, a form of column vectors, included in the dictionary D may be optimized for each class or, alternatively, set in a desired manner for each class. In FIG. 1, it may be assumed that each class corresponds to two sub-dictionaries. For example, in FIG. 1, $d_1$ and $d_2$ may correspond to the class 1, $d_3$ and $d_4$ may correspond to the class 2, and $d_5$ and $d_6$ may correspond to the class 3. However, the number of sub-dictionaries is not limited thereto, and may vary in an example or as necessary.

Further, in a case in which a predetermined or, alternatively, desired input image belongs to a predetermined or, alternatively, desired class, a column vector to represent the input image in the ideal representation Q may include remaining coefficients as "0", excluding coefficients to be used to represent the input image. Referring to FIG. 1, portions in boxes correspond to coefficients to be used to represent the input image. Column vectors $q_1, q_2,$ and $q_3$ to be used to represent the class 1 may have coefficients of "1" with respect to first and second rows. Column vectors $q_4, q_5, q_6,$ and $q_7$ to be used to represent the class 2 may have coefficients of "1" with respect to third and fourth rows. Column vectors $q_8, q_9,$ and $q_{10}$ to be used to represent the class 3 may have coefficients of "1" with respect to fifth and sixth rows. Remaining elements other than the aforementioned elements may have coefficients of "0". Although FIG. 1 illustrates a case in which the coefficients to be used to represent each class correspond to "1", at least one example embodiment is not limited thereto. According to at least some example embodiments, a preset or, alternatively, desired real number may be used in an example.

In FIG. 1, an ideal situation in which an error is not included is assumed. However, in a case in which an error is included, vector data corresponding to input images may be decomposed as expressed by Equation 1.

$$X=DZ+E \qquad \text{[Equation 1]}$$

In Equation 1, X denotes input images, D denotes a dictionary, and Z denotes a coefficient matrix, and E denotes an error matrix. The input images X and the dictionary D may be the same as the input images X and the dictionary D of FIG. 1. Further, similar to the ideal representation Q of FIG. 1, the coefficient matrix Z may be a set of coefficients to be used to represent an object included in the input images X based on the dictionary D. The error matrix E may include error components less associated with an object representation in the input images X.

Figure 2:
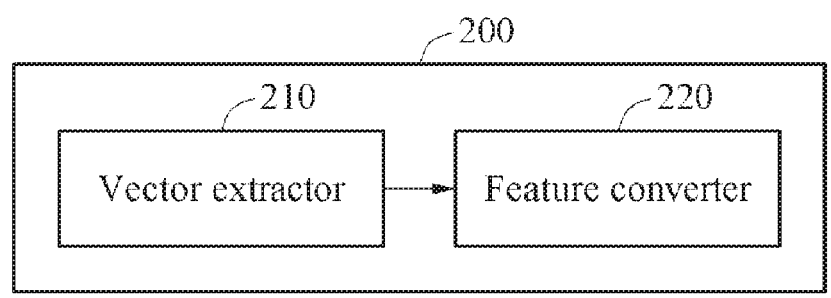
FIGS. 2 and 3 are block diagrams illustrating configurations of apparatuses for converting an input image including an object into discriminative feature data according to at least one example embodiment.
Figure 3:
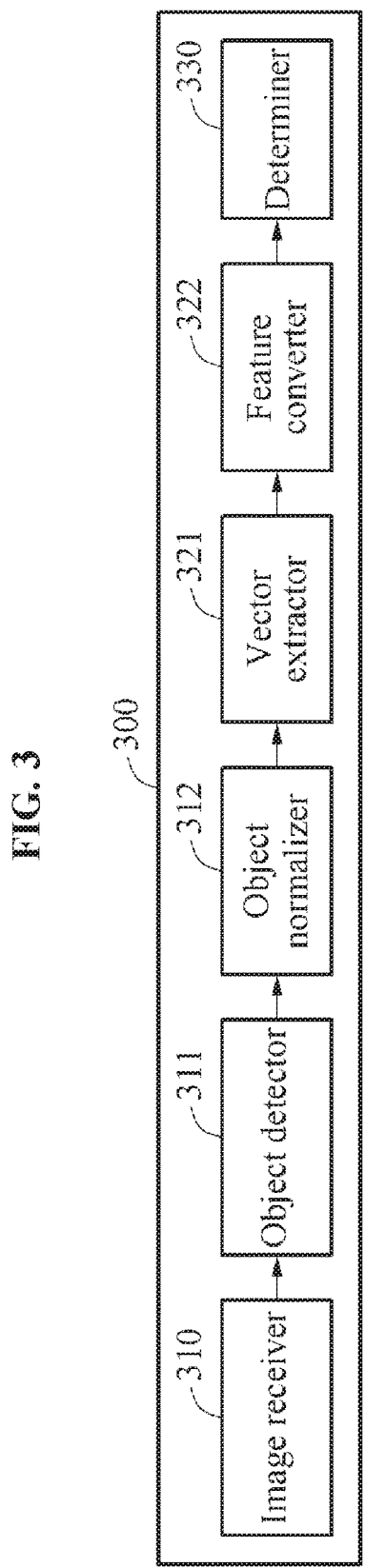

FIGS. 2 and 3 are block diagrams illustrating configurations of apparatuses for converting an input image including an object into discriminative feature data according to at least one example embodiment.

Referring to FIG. 2, an apparatus 200 for converting an input image including an object into discriminative feature data may include a vector extractor 210, and a feature converter 220.

The vector extractor 210 may extract vector data associated with an input image from the input image. Hereinafter, the vector data associated with the input image will be referred to as input vector data. For example, the vector extractor 210 may extract features of the input image in a form of vector data. The vector extractor 210 may extract the features of the input image in the form of the vector data by primarily extracting the features using a general feature extracting method such as local binary patterns (LBP) or Gabor, for example. In another example, the vector extractor 210 may extract the input image in a form of vector data.

The feature converter 220 may convert the input vector data into discriminative feature data based on a projection matrix having a fixed rank. The projection matrix may be generated based on a covariance matrix corresponding to training vector data. The discriminative feature data may be used to restore the input image. Furthermore, the feature converter 220 may convert the input vector data into the discriminative feature data by subtracting average vector data from the input vector data, and applying the projection matrix to the average vector data-subtracted input vector data. The training vector data may be vector data to be used to learn a dictionary and the projection matrix. The average vector data may be vector data corresponding to an average of the training vector data. Here, a process of learning the dictionary and the projection matrix will be described in detail with reference to FIGS. 4 through 6. Further, the covariance matrix corresponding to the training vector data will be described in detail in Equation 6.

For example, the discriminative feature data of the input image may indicate a value associated with a point at which the input image is more discriminative than another image, in the input image, and may be noise-robust. Herein, discriminative information may refer to information determined such that data points, for example, vector data of the same class are to be closer to each other, and data points of different classes are to be farther from each other.

Metric learning may be used to extract features of the input image. Here, metric may refer to calculation of a distance between features to be described below with reference to FIG. 3. Metric learning may refer to learning a method of calculating a more discriminative distance from provided training data. Metric learning may provide an excellent performance in visual analysis applications. In supervised metric learning, learning may be performed such that a distance between data points having different classes is to increase, and a distance between data points having the same class is to decrease.

Herein, robust discriminative metric learning (RDML) may be used. A rank of a coefficient matrix may be constrained to a low rank, and a rank of the projection matrix may be determined to be a pre-fixed or, alternatively, fixed rank. Here, the low rank may indicate a case in which a rank of a predetermined or, alternatively, desired matrix is less than a preset or, alternatively, set rank threshold, for example, a state in which the matrix has a minimum or, alternatively, desired rank. According to at least some example embodiments, the rank threshold may be set or, alternatively, preset to the minimum or, alternatively, desired rank of the matrix. Further, the pre-fixed or, alternatively, fixed rank may indicate a rank determined by a design, and may be determined by experiments, simulations, and calculations. The rank of the coefficient matrix may be optimized or, alternatively, set to a low rank, and the rank of the projection matrix may be determined to be a rank fixed in advance.

For example, RDML may remove unnecessary or redundant features and reduce noise, thereby emphasizing a global data structure. Further, RDML may be relatively insensitive to noise of various sources with respect to discriminative feature learning, and thus may determine noise-robust discriminative features. In addition, the projection matrix having the fixed rank and the coefficient matrix having the low rank may be learned in a low-dimensional sub-space, rather than a high-dimensional sub-space of the input image. Detailed descriptions thereof will be provided below with reference to FIGS. 4 through 6.

Referring to FIG. 3, an apparatus 300 for converting an input image including an object into discriminative feature data may include an image receiver 310, an object detector 311, an object normalizer 312, a vector extractor 321, a feature converter 322, and a determiner 330.

When the image receiver 310 receives an input image, the object detector 311 may detect an object area including an object from the input image. The object normalizer 312 may normalize the input image based on the object area. The vector extractor 321 may extract input vector data associated with the input image from the normalized input image. Here, the input vector data associated with the input image may be vector data indicating features of the input image or vector data indicating the input image. The feature converter 322 may convert the input vector data into noise-robust discriminative feature data based on the projection matrix described above. Further, the feature converter 322 may exclude average vector data from the input vector data, and convert the average vector data-excluded input vector data into feature data.

In detail, the image receiver 310 may receive the input image. Here, the image receiver 310 may receive the input image from an external device through a wired or wireless interface. In another example, the image receiver 310 may receive an input image stored in an internal memory in the apparatus 300.

The object detector 311 may detect the object area from the input image based on a predetermined or, alternatively, desired algorithm. For example, in a case in which the object is a human face, the object detector 311 may detect the object area based on a face recognition algorithm. Here, the predetermined or, alternatively, desired algorithm may include all algorithms that process an image to recognize a predetermined or, alternatively, desired object.

The object normalizer 312 may normalize the input image based on the detected object area to extract the input vector data from the input image. In an example, the object normalizer 312 may normalize the input image such that a size, pixels, a brightness, and a resolution of the input image may satisfy predetermined or, alternatively, desired requirements. For example, the object normalizer 312 may adjust the input image to be an image including an object area of a preset or, alternatively, set size. The object normalizer 312 may normalize the input image to compare images having different sizes, pixels, brightnesses, and resolutions under the same condition.

The determiner 330 may determine whether two images are similar to each other based on calculation of a distance between features. In an example, as a sum of distances between features, for example, discriminative feature data, of the two images decreases, a similarity between the two images may increase. Conversely, as the sum of the distances increases, the similarity between the two images may decrease. When the sum of the distances is less than a preset or, alternatively, set threshold distance, the two images may be determined to be similar to each other. For example, the features may be extracted in a form of vector data, for example, noise-robust discriminative feature data. The noise-robust discriminative feature data may be generated by applying the projection matrix having the fixed rank to the input vector data. Calculation of a distance between vector data may be expressed as given by Equation 2.

$$\text{distance } (A, B) = \sqrt{(a_1 - b_1)^2 + (a_2 - b_2)^2 + \ldots + (a_n - b_n)^2} \quad \text{[Equation 2]}$$

In Equation 2, distance(A, B) denotes a function to indicate a distance between vector data A and vector data B. Elements of the vector data A and the vector data B may be expressed as $A=[a_1, a_2, \ldots, a_n]$ and $B=[b_1, b_2, \ldots, b_n]$, respectively. Here, n may be an integer greater than or equal to "1", and unrelated to N of FIG. 1. For example, the vector data A and the vector data B may include values corresponding to features extracted from different images.

Further, the determiner 330 may calculate a similarity by comparing the features extracted from the input image to features extracted from another image. Here, the similarity may be calculated as expressed by Equation 3.

$$\text{similarity} = \cos(\theta) = \frac{A \cdot B}{\|A\|\|B\|} = \frac{\sum_{i=1}^{n} a_i b_i}{\sqrt{\sum_{i=1}^{n} a_i^2} \sqrt{\sum_{i=1}^{n} b_i^2}} \quad \text{[Equation 3]}$$

In Equation 3, A and B denote vector data corresponding to features extracted from respective images, and may be defined similar to the vector data A and the vector data B used in Equation 2.

For example, the determiner 330 may determine that the object included in the input image is the same as an object included in the other image when the similarity is greater than a preset or, alternatively, set threshold similarity. The determiner 330 may verify whether the similarity between the two images is greater than the threshold similarity through one-to-one comparison as described above. For example, whether the two images correspond to the same object, for example, face, may be verified.

In another example, the determiner 330 may calculate a similarity by comparing the extracted features to pre-stored or, alternatively, stored features corresponding to a plurality of objects. Here, the determiner 330 may determine that the object included in the input image is the same as an object corresponding to a feature having a similarity greater than the threshold similarity, among the pre-stored or, alternatively, stored features. Here, the plurality of objects may each be mapped to a label, for example, an identification (ID). In this example, the pre-stored or, alternatively, stored features corresponding to the plurality of objects may be stored in an object database. The determiner 330 may identify an ID having a greatest similarity through one-to-many comparison as described above. For example, an object may be identified from an image provided with respect to an unknown object, for example, face, based on the pre-stored or, alternatively, stored database.

Figure 4:
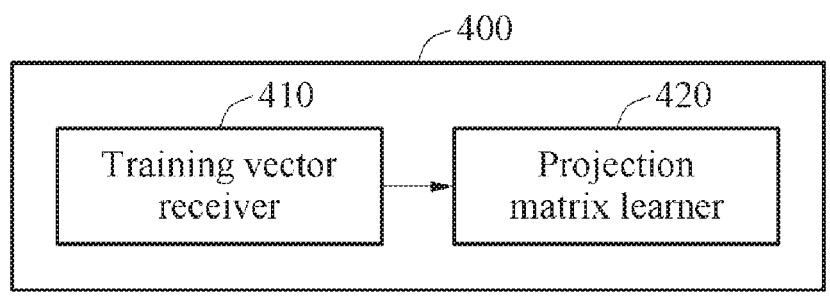
FIG. 4 is a block diagram illustrating a configuration of an apparatus for learning a projection matrix to convert a dimension of vector data associated with an input image according to at least one example embodiment.

FIG. 4 is a block diagram illustrating a configuration of an apparatus for learning a projection matrix to convert a dimension of input vector data associated with an input image according to at least one example embodiment.

Referring to FIG. 4, an apparatus 400 for learning a projection matrix to convert a dimension of input vector data associated with an input image may include a training vector receiver 410, and a projection matrix learner 420. Here, the input vector data associated with the input image may be referred to first dimensional vector data, and the first dimensional vector data may be high-dimensional vector data. The first dimensional vector data may be converted into second dimensional vector data by multiplying the first dimensional vector data by a projection matrix, and the second dimensional vector data may be low-dimensional vector data.

For example, the input vector data may correspond to an input image expressed in a form of vector data. Further, the input rector data may correspond to features representing the input image, the features expressed in a form of vector data.

The training vector receiver 410 may receive training vector data corresponding to a plurality of training images, respectively. Here, the training images may refer to sample images predetermined or, alternatively, desired to learn a dictionary and the projection matrix. The training vector data may include vector data corresponding to features of each training image.

The projection matrix learner 420 may learn the projection matrix having a fixed rank from the training vector data. For example, the projection matrix may be learned through metric learning which will be described below.

Existing face recognition schemes provide sufficient recognition performances only under restricted conditions. However, in a case in which the restricted conditions are not satisfied, for example, in a case in which a face image is captured in an environment in which a wide intra-personal variation occurs, the performances may rapidly decrease. Unlike the existing schemes, the present disclosure may provide a high recognition rate even in an environment in which a change in illumination, a change in pose, or noise occurs.

Herein, face recognitions may be classified into two types. For example, a person may be recognized by predicting an ID through comparison between an input image including a face and a plurality of pre-stored or, alternatively, stored features. Further, whether people appearing in a provided pair of images are the same person may be determined from the pair of images.

Metric learning used herein may be performed in view of various illuminations, a facial expression, a pose, a resolution, and a messy background of the input image in a case in which the input image includes a human face as an object.

Metric learning may learn a discriminative distance metric such that a distance between features of images belongs to the same class may decrease and a distance between features of images belonging to different classes may increase. For example, metric learning may correspond to a process of seeking a linear projection. Metric learning may learn linear transformation to map a sample object to a new feature space.

Furthermore, low-rank metric learning which applies a low-rank constraint to a coefficient matrix may be used. The projection matrix may have a fixed rank. Here, a metric matrix may be decomposed to the projection matrix.

Low-rank representation (LRR) may be used to emphasize a global structure of data. The global structure of data may be deduced from various sub-spaces. LRR may be the lowest rank representation among all candidates, and the candidates may each indicate a linear combination of bases. LRR may generate a block structural representation coefficient matrix, and the block structural representation coefficient matrix may represent a plurality of sub-space structures in samples. However, in a case in which a matrix Z corresponds to $Z \in R^{d \times m}$, a time complexity of Singular value decomposition (SVD) may be $O(\min(m^2d, d^2m))$. Thus, the performance may decrease in real-word large-scale applications. In an example, by applying a fast low-rank constraint to a low-dimensional space, a computational complexity may decrease and a processing rate may increase. For example, sub-space learning and fast low-rank representation may be jointly optimized or, alternatively, set in a desired manner. Learning of the projection matrix having the fixed rank and the dictionary will be described in detail below.

A coefficient matrix learned in low-rank metric learning may represent various sub-space structures of data. Further, a sparse error term may compensate for noise. More robust sub-spaces may be learned based on the low-rank constraint. For example, a fast low-rank representation scheme may handle large-scale data in the real world. In an example, by fixing one side to achieve stability, pre-learned or, alternatively, learned low-dimensional features may be incorporated into the low-rank constraint. The pre-learned or, alternatively, learned low-dimensional features may be sensitive to noise. Thus, instead of the pre-learned or, alternatively, learned low-dimensional features, LRR to implement learning of a compact and clean dictionary and a robust and stable sub-space may be searched. Furthermore, the fast low-rank representation scheme may improve a learning rate, and be applied to large-scale data in the real world.

RDML may constrain the coefficient matrix to a low rank. Further, a low-dimensional space may be established through the projection matrix having the fixed rank such that a distance between features belonging to the same class may decrease and a distance between features belonging to different classes may increase. For example, the low-rank constraint with respect to the coefficient matrix may remove non-informative features from the input image.

In metric learning, a Mahalanobis-like distance matrix $\mathcal{M}$ may be used. In general, a low-dimensional projection matrix P to a Euclidean space may be used to factorize the Mahalanobis-like distance matrix $\mathcal{M}$ to $\mathcal{M}=PP^T$. The Mahalanobis-like distance matrix $\mathcal{M}$ may be decomposed to a product of low-dimensional matrices as described above. In doing so, the Mahalanobis-like distance matrix $\mathcal{M}$ may guarantee a positive semi-definite (PSD) constraint.

For example, a discriminative metric may be deduced by minimizing distances between similar pairs, and maintaining distances between dissimilar pairs to be a lower limit. A distance metric for kinship verification may be learned by disposing intra-class samples to be close to each other, and separating inter-class samples lying in a neighborhood from each other. A metric may be generated by establishing a set of hierarchical non-linear transformations to transfer a labeled source domain to an unlabeled target domain. For example, the projection matrix may be learned such that a sum of distances between dissimilar pairs may be maximized or, alternatively, set to a desired level for metric learning, and a sum of squared distances of similar pairs may maintain an upper limit. For example, a side-information based linear discriminant analysis approach may be applied to face verification as a transformation of linear discriminant analysis (LDA).

Further, as a new regularization framework, a similarity metric may be learned by incorporating robustness to a large intra-personal variation and discriminative power of a novel similar metric.

In discriminative deep metric learning (DDML), a deep neural network may be trained to learn a set of hierarchical non-linear transformations to project face pairs into a sub-space having the same features.

Furthermore, by incorporating a structural term, for example, a low-rank or group sparse to constrain a metric matrix, non-informative features may be removed. For example, a bilinear similarity function may be applied to a high-dimensional data domain. In addition, a global structure of data may be learned through a low-rank representation deduced from a feature space and a sample space, and unnecessary or redundant features may be removed.

The projection matrix may be learned faster through RDML as follows.

For example, $\{X, G\} = \{(x_1, g_1), (x_2, g_2), \ldots, (x_m, g_m)\}$ may be assumed as a training data set. The training data set may be a data set to be used for training of a projection matrix and a dictionary. The training data set may include training vector data corresponding to inputs for training and labels corresponding to outputs designated with respect to the training vector data. The labels may be mapped to the training vector data, respectively. $x_i \in \mathbb{R}^d$ denotes an i-th item of training vector data, and m denotes a total size of the training vector data, for example, the number of items of the training vector data. The i-th item $x_i$ of the training vector data may be mapped to a label $g_i$. The label $g_i$ may be, for example, an ID indicating an object appearing in an image. A supervised metric algorithm may establish a semi-positive metric $\mathcal{M}$, which is Mahalanobis-like distance matrix, and the metric $\mathcal{M}$ may maintain all data points in the same class and separate all data points belonging to different classes. An objective function may be expressed as given by Equation 4.

$$\min_{\mathcal{M}} \sum_{(x_i, x_j) \in S} \|x_i - x_j\|^2_{\mathcal{M}} \qquad \text{[Equation 4]}$$

$$\text{s.t. } \mathcal{M} \succeq 0, \quad \sum_{(x_i, x_j) \in \mathcal{D}} \|x_i - x_j\|^2_{\mathcal{M}} \geq 1$$

In Equation 4, a Mahalanobis-like distance $\|x_i - x_j\|_{\mathcal{M}}$ between two items of vector data may be defined as $\sqrt{(x_i - x_j)^T \mathcal{M} (x_i - x_j)}$. S denotes a similar pair set including $x_i$ and $x_j$ belonging to the same class, and $\mathcal{D}$ denotes a dissimilar pair set including $x_i$ and $x_j$ belonging to different classes.

For example, $\mathcal{M} \in \mathbb{R}^{d \times d}$ may be decomposed to $\mathcal{M} = PP^T$, and $P \in \mathbb{R}^{d \times p}$ and $p \leq d$ may be satisfied. From the foregoing, $\|x_i - x_j\|_{\mathcal{M}}$ may be rewritten as $\|x_i - x_j\|_{\mathcal{M}} = \|P^T(x_i - x_j)\|_2$. Therefore, metric learning may be transformed to a process of seeking a linear projection P. Equation 4 may be transformed as expressed by Equation 5.

$$\min_{P} \frac{tr(P^T X \mathcal{L}_S X^T P)}{tr(P^T X \mathcal{L}_D X^T P)} \qquad \text{[Equation 5]}$$

In Equation 5, $\mathcal{L}_S$ denotes a laplacian matrix of S, and $\mathcal{D}$ $\mathcal{L}$ denotes a laplacian matrix of $\mathcal{D}$. tr(K) denotes a matrix trace operator to be used to calculate a trace of a matrix K.

Here, the trace is a function to add up diagonal elements of a square matrix. Equation 5 may correspond to a variant example of side-information based linear discriminant analysis (SILD). From an intra-personal sub-space that may limitatively reduce a number of intra-personal changes, Equation 5 may be expressed as an objective function of Equation 6.

$$P = \underset{P^T P = I_p}{\operatorname{argmin}} \mathcal{G}(P) = \underset{P^T P = I_p}{\operatorname{argmin}} \frac{tr(P^T C_S P)}{tr(P^T C_T P)} \quad \text{[Equation 6]}$$

In Equation 6, $\mathcal{G}(P)$ may be $$\frac{tr(P^T C_S P)}{tr(P^T C_T P)}.$$

$\mathcal{G}(P)$ denotes metric calculation using a covariance matrix. Herein, the metric calculation may be a mathematical expression associated with a degree of closeness between vector data corresponding to the same class, for example, the denominator of Equation 6, and a degree of farness between vector data corresponding to different classes, for example, the numerator of Equation 6. $C_S = X \mathcal{L}_S X^T$ may denote an intra-personal covariance matrix. However, example embodiments are not limited thereto. $C_S$ may be defined based on other settings, for example, image restricted settings or image unrestricted settings. $C_T$ may be a total covariance of data, and may be deduced from principal components analysis (PCA) and LDA. The total covariance may preserve a global structure of data and introduce more discriminative information. For example, the covariance matrix corresponding to the training vector data may include $C_S$ and $C_T$ described above. Further, $P^T P = I_p \in \mathbb{R}^{p \times p}$ may denote an orthogonality constraint.

Furthermore, since $\mathcal{M} = PP^T$ is satisfied and a rank of $PP^T$ is equal to a rank of P, rank($\mathcal{M}$)=rank(P) may be satisfied. In an example, without a constraint on the projecting matrix P, $P^T P = I_p \in \mathbb{R}^{p \times p}$ may enable the projection matrix P to have a fixed rank. By determining the rank of the projection matrix P to be a fixed rank, for example, a rank of the same value as that of the Mahalanobis-like distance metric $\mathcal{M}$, a calculation time used for learning may be saved and a model complexity may decrease.

Low-rank sub-space learning may handle corrupted data by learning a more robust and noise-removed projection, when compared to general sub-space learning. The low-rank sub-space learning may be applied to metric learning. A low-rank constraint to be applied to a low-dimensional space may reduce a computational complexity of optimization. In a case in which pre-learned or, alternatively, learned low-dimensional features are already corrupted, for example, in a case in which noise of various sources occurs, dictionary learning may be used to compensate for the corrupted low-dimensional features. Dictionary learning may represent data more excellently by learning a compact and discriminative basis. Dictionary learning may jointly deduce a dictionary and a sub-space learning framework guided by the low-rank constraint applied to noise in metric learning, instead of searching a dictionary in a high-dimensional space.

The dictionary learning and the constraint of Equation 6 may be set as expressed by an objective function of Equation 7.

$$\underset{Z,P,D,E}{\min} \operatorname{rank}(Z) + \lambda_1 \|E\|_1 + \lambda_2 \mathcal{G}(P) \quad \text{[Equation 7]}$$

$$\text{s.t. } P^T X = DZ + E, \ P^T P = I_p$$

In Equation 7, $Z \in \mathbb{R}^{n \times m}$ denotes a low-rank coefficient matrix, and $E \in \mathbb{R}^{p \times m}$ denotes a sparse error term. $D \in \mathbb{R}^{p \times n}$ denotes a dictionary according to an at least one example embodiment in a low-dimensional space.

In Equation 7, the low-rank representation may be used to represent the global structure of data and sense noise. Here, the low-rank representation may be a representation to indicate data corresponding to features of an input image, and may include, for example, a matrix having a low rank. Although a rank minimization problem is known as being non-deterministic polynomial-time (NP) hard, the rank minimization problem may be alleviated using a convex surrogate such as a nuclear norm. For example, Equation 7 may be transformed as expressed by Equation 8.

$$\underset{Z,P,D,E}{\min} \|Z\|_* + \lambda_1 \|E\|_1 + \lambda_2 \mathcal{G}(P) \quad \text{[Equation 8]}$$

$$\text{s.t. } P^T X = DZ + E, \ P^T P = I_p$$

Equation 8 may indicate a function to obtain metric calculation $\mathcal{G}(P)$, a coefficient matrix Z, and an error matrix E using covariance matrices $C_S$ and $C_T$, and a rank of the coefficient matrix Z.

Here, D denotes the aforementioned dictionary which is, for example, a set of base vector data in a form of elements. For example, Z denotes a coefficient matrix having a low rank, and may imply a global structure of data. DZ being a product of the dictionary D and the coefficient matrix Z may also have a low rank. E denotes a sparse error term, which indicates a sparse error matrix. $\|\cdot\|_*$ denotes a nuclear norm, which indicates a sum of singular values of a matrix. $\|\cdot\|_1$ denotes $l_1$-norm, which indicates an absolute element sum of the matrix.

By Equation 8, the low-rank representation may be introduced to the coefficient matrix Z. Through the application of the low-rank representation, unnecessary or redundant features may be removed from vector data, and the global structure of the data may be emphasized.

In an example, constraints applied to Equation 8 may be $P^T X = DZ + E$ and $P^T P = I_p$. When P having the fixed rank is introduced through $P^T P = I_p$, data more robust and insensitive to noise than $P^T X = DZ + E$ may be obtained. Further, by fixing the rank of the projection matrix P and deducing the low rank of the coefficient matrix Z, the computational complexity may decrease.

In addition, in Equation 8, calculation of the nuclear norm in each iteration may increase the computational complexity. Thus, to process large-scale data sets efficiently, a relationship between a matrix nuclear norm and a Frobenius norm of factor matrices may be expressed as given by Equation 9.

$$\|Z\|_* = \underset{U,V}{\operatorname{argmin}} \frac{1}{2}(\|U\|_F^2 + \|V\|_F^2), \text{ s.t., } Z = UV \quad \text{[Equation 9]}$$

In Equation 9, when assuming r as a rank of Z, for example, r<<min(m,n), Equation 9 may be achieved if Z=UV, and $U \in \mathbb{R}^{n \times r}$ and $V \in \mathbb{R}^{r \times m}$ may be satisfied. In Equation 9, $\|U\|^2_F$ and $\|V\|^2_F$ denote a Frobenius norm with respect to a matrix U and a Frobenius norm with respect to a matrix V, respectively.

Information on the rank of Z may be obtained with respect to the supervised learning, and thus a low-rank minimization problem may be transformed to a fixed rank problem. Accordingly, Equation 8 may be transformed to Equation 10 based on Equation 9.

$$\min_{Z,P,D,U,V,E} \frac{1}{2}(\|U\|^2_F + \|V\|^2_F) + \lambda_1 \|E\|_1 + \lambda_2 \mathcal{G}(P) \quad \text{[Equation 10]}$$
$$\text{s.t. } P^T X = DZ + E, Z = UV, P^T P = I_p.$$

Equation 10 may indicate a fast low-rank representation in a sub-space for robust metric learning. For example, a nuclear norm $\|Z\|_*$ requiring a calculation time may be replaced with a sum of two Frobenius norms $\|U\|_F^2 + \|V\|_F^2$ with a constraint of Z=UV. For ease of description, U may be referred to as a first sub-coefficient matrix, and V may be referred to as a second sub-coefficient matrix. An internal dimension r may provide a fixed rank decomposition, and thus a calculation in a form of trace norm requiring time may be omitted. Furthermore, a low-dimensional clean dictionary D may be introduced to compensate for a corrupted sub-space.

Equation 10 may be transformed to a minimization problem of Equation 11 through application of an augmented Lagrangian function.

$$\mathcal{L} = \frac{1}{2}(\|U\|^2_F + \|V\|^2_F) + \lambda_1 \|E\|_1 + \quad \text{[Equation 11]}$$
$$\lambda_2 \mathcal{G}(P) + \langle Y_1, P^T X - DZ - E \rangle + \langle Y_2, Z - UV \rangle +$$
$$\frac{\mu}{2}(\|P^T X - DZ - E\|_F^2 + \|Z - UV\|_F^2)$$

In Equation 11, Y1 and Y2 denote Lagrange multipliers, and $\mu>0$ denotes a small positive penalty parameter. <A, B> denotes an inner product of two matrices A and B. Furthermore, a trace ratio $\mathcal{G}(P)$ may be transformed to a more simplified form of $\mathcal{G}(P)=\text{tr}(P^T C_S P)-\lambda_3 \text{tr}(P^T C_T P)=\text{tr}(P^T(C_S-\lambda_3 C_T)P)$, in detail, a form of a trace difference. $\lambda_3>0$ may denote a trade-off between two terms. In Equation 11, by fixing the dictionary D through an iterative manner, P, Z, U, V, and E may be optimized one by one or, alternatively, set to a desired level one by one. When P, Z, U, V, and E are optimized or, alternatively, set in a desired manner, the dictionary D may be updated using the optimized or desirably set P, Z, U, V, and E as constants.

In an example, the dictionary D may be fixed, and the low-rank representation variables Z, U, and V, the low-dimensional projection matrix P, and the error term E may be updated one by one.

For example, variables in a t-th iteration may be defined as $P_t$, $Z_t$, $U_t$, $V_t$, and $E_t$, and the variables may be optimized or, alternatively, set in a desired manner in a (t+1)-th iteration as expressed by Equations 12 through 21.

In detail, $Z_{t+1}$ may be deduced from Equation 11, as expressed by Equation 12.

$$Z_{t+1} = \arg\min_Z \langle Y_1, P_t^T X - DZ - E_t \rangle + \langle Y_{2,t}, Z - U_t V_t \rangle + \quad \text{[Equation 12]}$$

-continued
$$\frac{\mu}{2}(\|P_t^T X - DZ - E_t\|_F^2 + \|Z - U_t V_t\|_F^2).$$

Equation 12 may be transformed to a closed form with respect to $Z_{t+1}$, as expressed by Equation 13. In an example, the low-rank representation Z in the (t+1)-th iteration may be updated by Equation 13.

$$Z_{t+1} = (I_n + D^T D)^{-1}\left(D^T(P_t^T X - E_t) + U_t V_t + \frac{D^T Y_{1,t} + Y_{2,t}}{\mu}\right) \quad \text{[Equation 13]}$$

Further, $U_{t+1}$ may be deduced from Equation 11, as expressed by Equation 14.

$$U_{t+1} = \quad \text{[Equation 14]}$$
$$\arg\min_U \frac{1}{2}\|U\|_F^2 + \langle Y_{2,t}, Z_{t+1} - UV_t \rangle + \frac{\mu}{2}(\|Z_{t+1} - UV_t\|_F^2).$$

Equation 14 may be transformed to a closed form with respect to $U_{t+1}$, as expressed by Equation 15. In an example, the low-rank representation U in the (t+1)-th iteration may be updated by Equation 15.

$$U_{t+1} = (I_r + \mu V_t^T V_t)(\mu Z_{t+1} V_t^T - Y_{2,t} V_t^T)^{-1} \quad \text{[Equation 15]}$$

In addition, $V_{t+1}$ may be deduced from Equation 11 as expressed by Equation 16.

$$V_{t+1} = \arg\min_V \frac{1}{2}\|V\|_F^2 + \quad \text{[Equation 16]}$$
$$\langle Y_{2,t}, Z_{t+1} - U_{t+1} V \rangle + \frac{\mu}{2}(\|Z_{t+1} - U_{t+1} V\|_F^2).$$

Equation 16 may be transformed to a closed form, as expressed by Equation 17. In an example, the low-rank representation V in the (t+1)-th iteration may be updated by Equation 17.

$$V_{t+1} = (I_r + \mu U_{t+1}^T U_{t+1})^{-1}(\mu U_{t+1}^T Z_{t+1} - U_{t+1}^T Y_{2,t}) \quad \text{[Equation 17]}$$

Furthermore, an error term $E_{t+1}$ may be deduced from Equation 11 as expressed by Equation 18.

$$E_{t+1} = \arg\min_E \frac{\lambda_1}{\mu}\|E\|_1 + \frac{1}{2}(\|E - \bar{E}_t\|_F^2) \quad \text{[Equation 18]}$$

In Equation 18, $$\bar{E}_t = P_t^T X - DZ_{t+1} + \frac{Y_{1,t}}{\mu}$$

may be satisfied. Equation 18 may be calculated through singular value thresholding (SVT).

In addition, a projection matrix $P_{t+1}$ may be deduced from Equation 11, as expressed by Equation 19.

$$P_{t+1} = \arg\min_{P^T P = I_p} \lambda_2 \mathcal{G}(P) + \frac{\mu}{2}(\|P^T X - \bar{X}_t\|_F^2) \quad \text{[Equation 19]}$$

Equation 19 may not be convex due to an orthogonality constraint. Further, $$\overline{X}_t = DZ_{t+1} + E_{t+1} - \frac{Y_{1,t}}{\mu}$$

may be satisfied. According to the orthogonality constraint, Equation 19 may be transformed to Equation 20.

$$P_{t+1} = \arg\min_P \lambda_2 \mathcal{G}(P) + \frac{\mu}{2}\left(\|P^T X - \overline{X}_t\|_F^2\right) \quad \text{[Equation 20]}$$

Equation 20 may be transformed to a closed form as expressed by Equation 21. In an example, the projection matrix P in the (t+1)-th iteration may be updated by Equation 21.

$$P_{t+1} = \left(\frac{\lambda_2}{\mu}(C_S - \lambda_3 C_T) + XX^T + I_d\right)^{-1} \overline{X}_t. \quad \text{[Equation 21]}$$

To guarantee that P is orthogonal, an orthogonal operation may be applied. For example, $P_{t+1}=\text{orth}(P_{t+1})$ may be applied. Here, orth( ) denotes an orthogonal operator.

A process of updating P, Z, U, V, and E may be represented as shown in an algorithm of Table 1. Different balance parameters may be adjusted in an experiment, and parameters $\mu_0$, $\rho$, $\in$, maxIter, and $\max_\mu$ may be empirically set.

TABLE 1

Inputs: X, D, $\lambda_1$, $\lambda_2$, $\lambda_3$
 $Z_0 = U_0 = V_0 = E_0 = Y_{1,0} = Y_{2,0} = 0$
Initialization: $\mu_0 = 10^{-6}$, $\rho = 1.1$, $\max_\mu = 10^6$, $\in = 10^{-6}$
while not converged or t < maxIter do
1. update $Z_{t+1}$ based on Equation 13 while fixing remaining variables
2. update $U_{t+1}$ based on Equation 15 while fixing remaining variables
3. update $Z_{t+1}$ based on Equation 17 while fixing remaining variables
4. update $E_{t+1}$ based on Equation 18 while fixing remaining variables
5. update $P_{t+1}$ based on Equation 21 while fixing remaining variables
6. update multipliers $Y_{1,t+1}$ and $Y_{2,t+1}$ as follows
 $Y_{1,t+1} = Y_{1,t} + \mu_t(P_{t+1}^T X - DZ_{t+1} - E_{t+1})$;
 $Y_{2,t+1} = Y_{2,t} + \mu_t(Z_{t+1} - U_{t+1}V_{t+1})$;
7. update parameter $\mu_{t+1}$ to $\mu_{t+1} = \min(\rho\mu_t, \max_\mu)$
8. determine whether first convergence conditions are satisfied
 $\|P_{t+1}^T X - DZ_{t+1} - E_{t+1}\|_\infty < \in$,
 $\|Z_{t+1} - U_{t+1}V_{t+1}\|_\infty < \in$,
9. t = t + 1.
end while
Outputs: P, Z, U, V, E Based on the algorithm of Table 1, in response to completion of updating P, Z, U, V, and E, for example, in response to the first convergence conditions being satisfied, the apparatus 400 for learning a projection matrix to convert a dimension of input vector data associated with an input image may update the dictionary D based on Equations 22 through 24. For example, the apparatus 400 for learning a projection matrix may minimize an objective function of Equation 22.

$$D = \arg\min_D \frac{\mu}{2}\left\|P_*^T X - DZ_* - E_* + \frac{Y_{1,*}}{\mu}\right\|_F^2 \quad \text{[Equation 22]}$$

Equation 22 may indicate a quadratic form of a variable D in a case in which other variables, for example, P*, Z*, E*, and $Y_{1,*}$ denoting the outputs of the algorithm of Table 1, are fixed. From Equation 22, an optimal or, alternatively, desired dictionary D* may be deduced as expressed by Equation 23.

$$D^* = \left(P_*^T X - E_* + \frac{Y_{1,*}}{\mu}\right)Z_*^T(Z_* Z_*^T)^{-1} \quad \text{[Equation 23]}$$

From Equation 23, a dictionary D to be updated may be determined as expressed by Equation 24.

$$D_{t_d+1} = \gamma D_{t_d} + (1-\gamma)D^* \quad \text{[Equation 24]}$$

In Equation 24, $\gamma$ denotes a weight parameter to control an updating operation, and may be set to, for example, $\gamma=0.95$ for simplification. To initialize the dictionary, K-SVD may be applied. An initial sub-dictionary $D^i$ with respect to a class i may be obtained by a preset or, alternatively, set count of iterations within each training class. An input dictionary $D_o$ may be initialized by combining dictionaries of all individual classes, for example, $D_0=[D^1, D^2, \ldots, D^c]$. An algorithm with respect to a process of updating a dictionary may be represented as shown in Table 2.

TABLE 2

Inputs: X, $\lambda_1$, $\lambda_2$, $\lambda_3$, $\gamma$
Initialization: Initial dictionary $D_0$, $\in = 10^{-6}$, $t_d = 0$
while not converged or t < maxIter do
1. optimize Equation 1 with respect to $D_{t_d}$
2. update $D_{t_d+1}$ based on Equation 24 while fixing remaining variables
3. determine whether second convergence conditions are satisfied
 $\|D_{t_d+1} - D_{t_d}\|_\infty < \in$
9. $t_d = t_d + 1$.
end while
Outputs: D, P, Z, E, U, V A complexity of the above algorithm may be calculated as follows. For example, in the algorithm of Table 1, $O(m^2 n)$ may be used for the process 1 with respect to $Z \in R^{n \times m}$, wherein, for example, the dictionary size n may be less than a sample size m, $O(n^2 r)$ may be used for the process 2, $O(m^2 r)$ may be used for the process 3, and $O(d^2 p)$ may be used to update the sub-space. Thus, a time used for the algorithm of Table 1 with respect to $k_1$ iterations may correspond to $T_1=O(k_1(m^2 n+n^2 r+m^2 r+d^2 p))$. The algorithm of Table 2 may require a major time cost which is inversely proportional to a matrix product, and thus $O(n^2 p)$ may be used for the process 2 with respect to $D \in \mathbb{R}^{p \times n}$, and $O(k_2(n^2 p+T_1))$ may be used for the algorithm of Table 2 with respect to all $k_2$ iterations.

When compared to the existing schemes, the algorithms of Tables 1 and 2 may have excellent recognition performance, provide fast and stable performance as the count of optimization iterations increases, and be more noise-robust.

For reference, through an optimization to satisfy Karush-Kuhn-Tucker (KKT) conditions, the algorithm of Table 1 may converge. For example, the algorithm of Table 1 may converge to a point at which the KKT conditions are satisfied, based on conditions of Equation 25.

• $P_t^T X - DZ_t - E_t = 0$, [Equation 25]

• $Z_t - U_t V_t = 0$,

-continued

- $\frac{\partial \mathcal{L}}{\partial P} = P_t \hat{X} - \tilde{X} = 0,$

- $\frac{\partial \mathcal{L}}{\partial Z} = (I_n + D^T D)Z_t - \overline{D} = 0,$

- $\frac{\partial \mathcal{L}}{\partial U} = U_t(\mu Z_t V_t^T - Y_{2,t} V_t^T) - (I_r + \mu V_t^T V_t) = 0,$

- $\frac{\partial \mathcal{L}}{\partial V} = (I_r + \mu U_t^T U_t)V_t - (\mu U_t^T Z_t - U_t^T Y_{2,t}) = 0,$

- $E_t - S\left(P_t^T X - D Z_t + \frac{Y_{1,t}}{\mu}, \frac{1}{\mu}\right) = 0,.$ In Equation 25, $\hat{X} = \frac{\lambda_2}{\mu}(C_S - \lambda_3 C_T) + X^T + I_d,$ $\tilde{X} = D Z_t + E_e - \frac{Y_{1,t}}{\mu},$ $\overline{D} = D^T(P_t^T X - E_t) + U_t V_t + \frac{D^T Y_{1,t} + Y_{2,t}}{\mu},$ and sign(x)max(|x|−T,0), may be satisfied.

In addition, while optimizing the fixed dictionary D or, alternatively, setting the fixed dictionary D in a desired manner, $G \triangleq (P,Z,U,V,E,Y_1,Y_2)$ and $\{G^t\}_{t=1}^{\infty}$ may be defined as outputs, $\{G^t\}_{t=1}^{\infty}$ may be bounded, and $\lim_{t\to\infty}\{G^{t+1}-G^t\}=0$ may be assumed. A predetermined or, alternatively, desired accumulation point of $\{G^t\}_{t=1}^{\infty}$ may satisfy the KKT conditions. In detail, irrespective of the convergence of $\{G^t\}_{t=1}^{\infty}$, the algorithm of Table 1 may converge to a KKT point.

Figure 5:
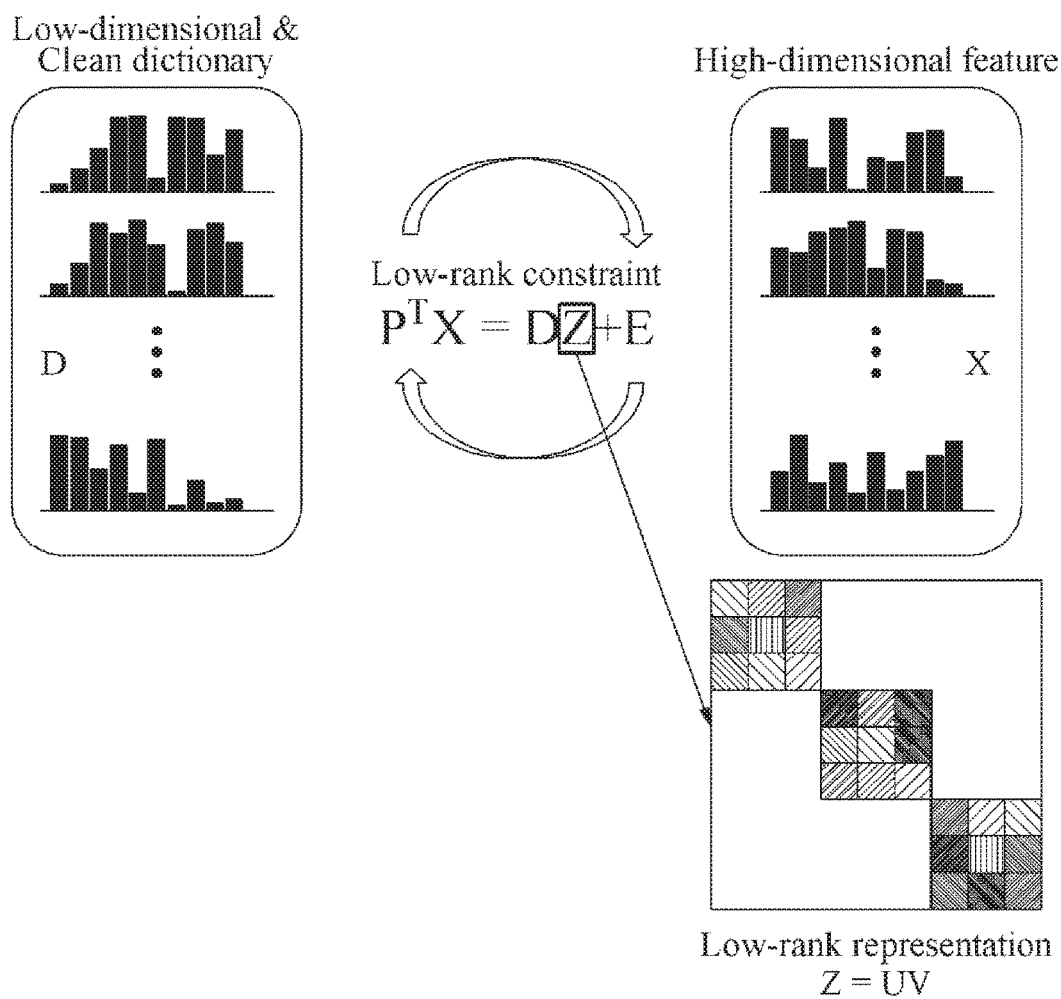
FIG. 5 illustrates examples of first dimensional vector data, a coefficient matrix, and a projection matrix according to at least one example embodiment.

FIG. 5 illustrates examples of first dimensional vector data, a coefficient matrix, and a projection matrix according to at least one example embodiment.

In FIG. 5, X is an example of first dimensional vector data associated with an input image, P is an example of a projection matrix having a fixed rank, Z is an example of a coefficient matrix, and D is an example of a dictionary.

For example, vector data, for example, $P^T X$, obtained by reflecting the projection matrix P in the input image X may be the same as vector data, for example, DZ+E, obtained by adding a sparse error matrix E to a product of the dictionary D and the coefficient matrix Z, which corresponds to the constraint of Equation 8.

Here, when the projection matrix P is reflected in the first dimensional vector data X, second dimensional vector data $P^T X$ may be generated. For example, a first dimension of the first dimensional vector data may be higher than a second dimension of the second dimensional vector data. For example, the first dimension may be referred to as a high dimension, and the second dimension may be referred to as a low dimension.

Figure 6:
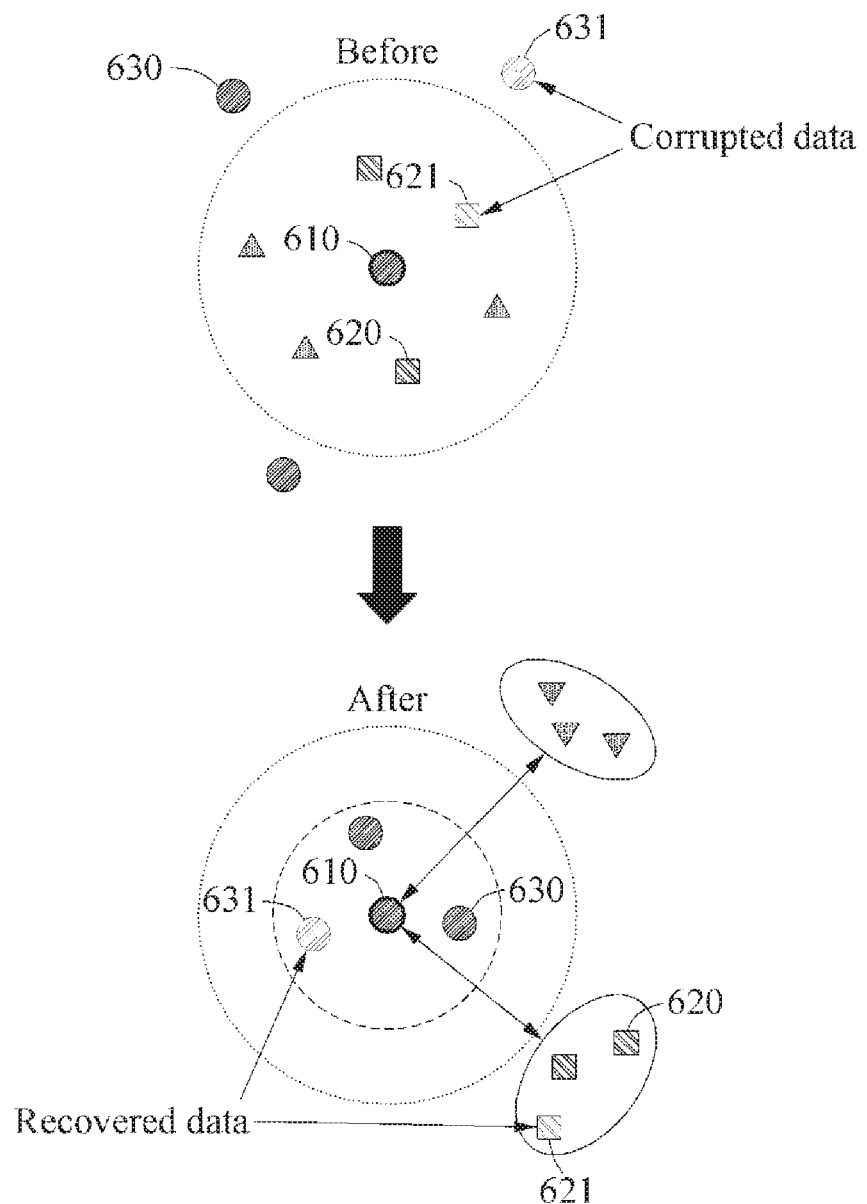
FIG. 6 illustrates positional changes in vector data in which a projection matrix is reflected according to at least one example embodiment.

FIG. 6 illustrates positional changes in vector data in which a projection matrix is reflected according to at least one example embodiment.

In detail, FIG. 6 illustrates a space showing predetermined or, alternatively, desired data points 610, 620, 621, 630, and 631 of vector data. An upper portion of FIG. 6, for example, before, shows data points of first dimensional vector data, and a lower portion of FIG. 6, for example, after, shows data points of second dimensional vector data obtained by reflecting a projection matrix in the first dimensional vector data.

For example, data points corresponding to a first class, for example, data points 610, 630, and 631, may be indicated with circles, and data points corresponding to a second class, for example, data points 620 and 621, may be indicated with squares, and data points corresponding to a third class may be indicated with triangles. Here, there may be a data point, for example, the data point 631, corrupted by noise, among the data points corresponding to the first class. There may also be a data point, for example, the data point 621, corrupted by noise, among the data points corresponding to the second class.

Referring to the upper portion of FIG. 6, in the first dimensional vector data, the data point 610 corresponding to the first class may be relatively close to the data points corresponding to the second class, for example, the data points 620 and 621, and the data points corresponding to the third class, and may be relatively distant from a portion of the data points corresponding to the first class, for example, the data points 630 and 631. Referring to the lower portion of FIG. 6, in the second dimensional vector data obtained by converting the first dimensional vector data through the projection matrix, the data point 610 corresponding to the first class may be relatively distant from the data points corresponding to the second class, for example, the data points 620 and 621, and the data points corresponding to the third class, and may be relatively close to the data points corresponding to the first class, for example, the data points 630 and 631. In an example, even in a case of corrupted data, the corrupted data point 631 corresponding to the first class may be disposed close to the data point 610 corresponding to the first class, and the corrupted data point 621 corresponding to the second class may be disposed far from the data point 610 corresponding to the first class.

Figure 7:
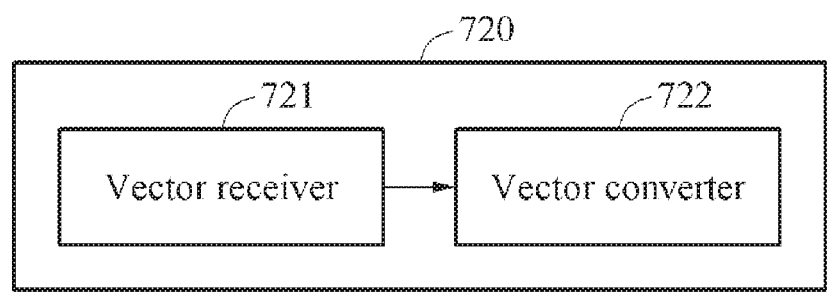
FIG. 7 is a block diagram illustrating an apparatus for converting a vector corresponding to an input image according to at least one example embodiment.

FIG. 7 is a block diagram strafing an apparatus for converting a vector corresponding to an input image according to at least one example embodiment.

Referring to FIG. 7, an apparatus 720 for converting a vector corresponding to an input image may include a vector receiver 721, and a vector converter 722.

The vector receiver 721 may receive first dimensional vector data associated with an input image including an object. Here, the first dimensional vector data may be denoted as X. For example, the first dimensional vector data may be provided in a form of vector data of the input image, or in a form of vector data of features of the input image.

The vector converter 722 may convert the received first dimensional vector data into second dimensional vector data based on a projection matrix. Here, the projection matrix may be denoted as P, and the second dimensional vector data may be denoted as $P^T X$. Further, the vector converter 722 may subtract average vector data from the first dimensional vector data, and convert the first dimensional vector data into the second dimensional vector data by applying the projection matrix having a fixed rank to the average vector data-subtracted first dimensional vector data.

The apparatus 720 for converting a vector corresponding to an input image may operate as the feature converter 220 of FIG. 2 or the feature converter 322 of FIG. 3. For example, the vector receiver 721 of FIG. 7 may receive the input vector data extracted by the vector extractor 210 of FIG. 2 or the vector extractor 321 of FIG. 3.

Figure 8:
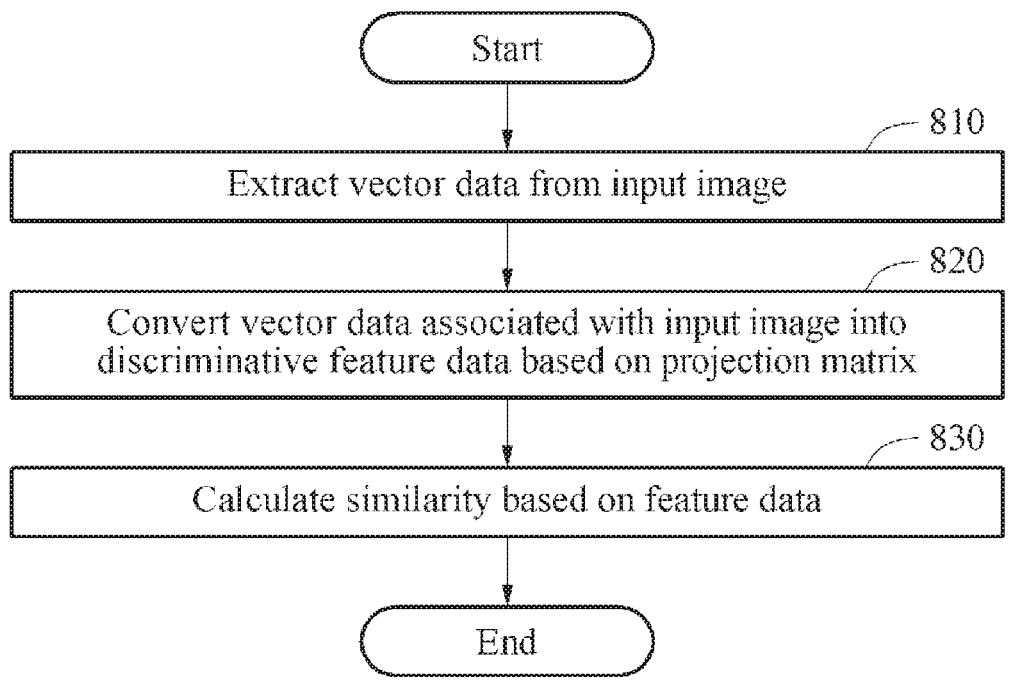
FIG. 8 is a flowchart illustrating a method of converting an input image including an object into discriminative feature data according to at least one example embodiment.

FIG. 8 is a flowchart illustrating a method of converting an input image including an object into discriminative feature data according to at least one example embodiment.

Referring to FIG. 8, in operation 810, a vector extractor may extract vector data associated with an input image from the input image. For example, the vector extractor may extract the input image in a form of vector data, or extract features of the input image in a form of vector data.

In operation 820, a feature converter may extract features based on a projection matrix. For example, the feature converter may convert the vector data associated with the input image into discriminative feature data, for example, second dimensional vector data, based on the projection matrix having a fixed rank. The projection matrix may be generated based on a covariance matrix of training vector data. For example, the feature converter may convert first dimensional vector data X corresponding to the input image, for example, the vector data associated with the input image, into the second dimensional vector data $P^TX$, for example, the discriminative feature data of the input image, by applying the projection matrix P to the first dimensional vector data X corresponding to the input image. In this example, the feature converter may subtract average vector data from the vector data associated with the input image, and apply the projection matrix to the average vector data-subtracted vector data. In detail, the features may be extracted as described in the process of FIG. 2 or 3.

In operation 830, a determiner may calculate a similarity based on the feature data. For example, the determiner may calculate a similarity or a distance between vector data corresponding to feature data of images based on Equation 2 or 3.

Figure 9:
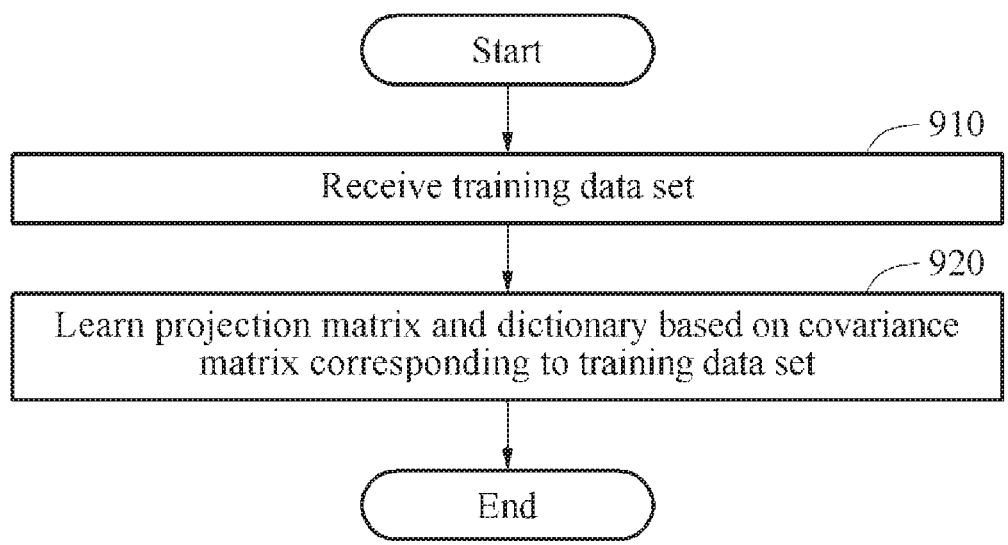
FIGS. 9 and 10 are flowcharts illustrating a method of learning a projection matrix to convert a dimension of vector data associated with an input image according to at least one example embodiment.
Figure 10:
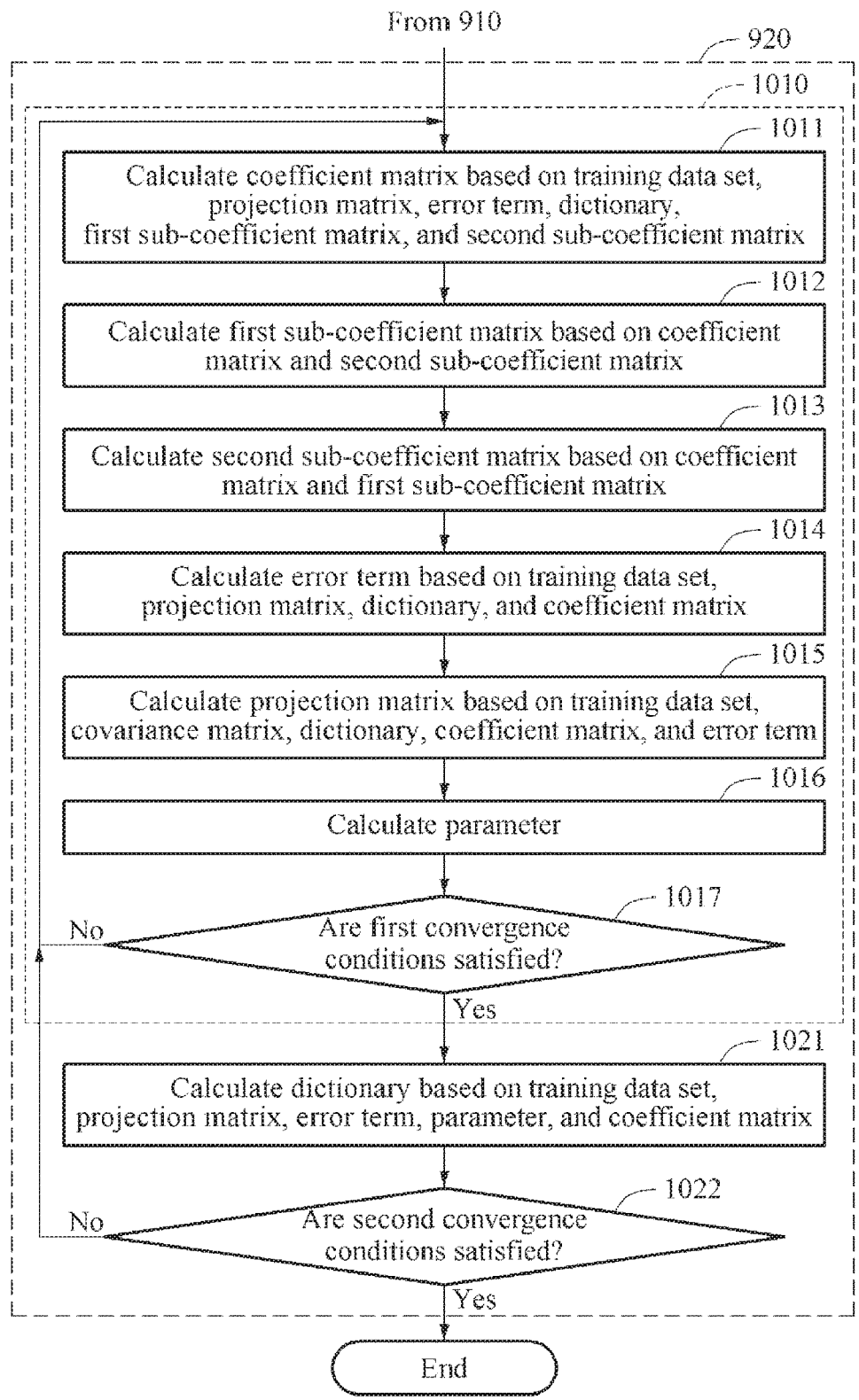

FIGS. 9 and 10 are flowcharts illustrating a method of learning a projection matrix to convert a dimension of input vector data associated with an input image according to at least one example embodiment.

FIG. 9 illustrates a process of learning a projection matrix.

Referring to FIG. 9, in operation 910, a training vector receiver may receive a training data set. For example, the training vector receiver may receive training vector data corresponding to a plurality of training images and labels mapped to the training vector data.

In operation 920, a projection matrix learner may learn a projection matrix and a dictionary based on a covariance matrix corresponding to the training data set. In an example, the projection matrix learner may jointly learn the dictionary and the projection matrix having a fixed rank based on the training vector data. For example, the projection matrix learner may learn the projection matrix based on the dictionary, and learn the dictionary based on the learned projection matrix. The projection matrix learner may learn the projection matrix and the dictionary by iteratively performing the 2-step learning process until the dictionary and the projection matrix converge. In this process, the projection matrix learner may maintain a rank of the projection matrix to be a fixed rank.

For example, the projection matrix learner may determine the projection matrix such that a difference between elements corresponding to the same object may be minimized or, alternatively, decreased or set to a desired level and a difference between elements corresponding to different objects may be maximized or, alternatively, increased or set to a desired level in the training vector data, to obtain more discriminative information based on Equation 6.

Further, the projection matrix learner may learn the projection matrix based on Equation 8. For example, the projection matrix learner may determine the projection matrix such that vector data obtained by reflecting the projection matrix in the input vector data is to be the same as vector data obtained by adding a sparse error matrix to a product of the dictionary and a coefficient matrix. Here, the projection matrix learner may determine the projection matrix based on a rank of the coefficient matrix and metric calculation using the covariance matrix, for example, $\vartheta(P)$ of Equation 6. In detail, the projection matrix learner may determine the projection matrix by minimizing a linear combination of the metric calculation using the covariance matrix, a nuclear norm of the coefficient matrix, and an absolute element sum of the sparse error matrix, based on Equation 8.

The rank of the projection matrix is fixed and is not considered. Thus, the projection matrix learner may determine the projection matrix relatively faster. The projection matrix learner may iteratively calculate the projection matrix and the dictionary as described above, thereby generating a convergent projection matrix and a convergent dictionary.

In addition, the projection matrix learner may learn the projection matrix and the dictionary based on Equation 10 transformed from Equation 8. For example, the projection matrix learner may determine the projection matrix such that vector data corresponding to the input image in which projection matrix is reflected may be the same as vector data obtained by adding the sparse error matrix to the product of the dictionary and the coefficient matrix. In this example, the coefficient matrix may be a product of a first sub-coefficient matrix and a second sub-coefficient matrix, and the projection matrix may be under an orthogonality constraint. Here, the projection matrix learner may determine the projection matrix based on the metric calculation using the covariance matrix, a Frobenius norm of the first sub-coefficient matrix, a Frobenius norm of the second sub-coefficient matrix, and the sparse error matrix. In detail, the projection matrix learner may determine the projection matrix by minimizing a linear combination of the metric calculation using the covariance matrix, a sum of the Frobenius norms of the first sub-coefficient matrix and the second sub-coefficient matrix constituting the coefficient matrix, and an absolute element sum of the sparse error matrix, based on Equation 10.

In detail, the projection matrix may be learned as described with reference to FIGS. 4 through 6. However, example embodiments are riot limited thereto. The projection matrix learner may learn the projection matrix using all algorithms and calculation methods to achieve the constraints of Equation 8.

FIG. 10 illustrates operation 920 of FIG. 9 in detail.

Referring to FIG. 10, in operation 1010, the projection matrix learner may calculate variables except for the dictionary.

For example, in operation 1011, the projection matrix learner may calculate the coefficient matrix based on the training data set, the projection matrix, an error term, the dictionary, the first sub-coefficient matrix, and the second sub-coefficient matrix. In detail, the projection matrix learner may calculate the coefficient matrix based on Equation 13.

In operation 1012, the projection matrix learner may calculate the first sub-coefficient matrix based on the coefficient matrix and the second sub-coefficient matrix. In detail, the projection matrix learner may calculate the first sub-coefficient matrix based on Equation 15.

In operation 1013, the projection matrix learner may calculate the second sub-coefficient matrix based on the coefficient matrix and the firs sub-coefficient matrix. In detail, the projection matrix learner may calculate the second sub-coefficient matrix based on Equation 17.

In operation 1014, the projection matrix learner may calculate the error term based on the training data set, the projection matrix, the dictionary, and the coefficient matrix. In detail, the projection matrix learner may calculate the error term based on Equation 18. Here, the error term may correspond to the sparse error matrix.

In operation 1015, the projection matrix learner may calculate the projection matrix based on the training data set, the covariance matrix, the dictionary, the coefficient matrix, and the error term. For example, the projection matrix learner may calculate the projection matrix based on Equation 21.

In operation 1016, the projection matrix learner may calculate a parameter. For example, the projection matrix learner may update the parameter based on the seventh operation of Table 1.

In operation 1017, the projection matrix learner may determine whether the calculated variables satisfy first convergence conditions. For example, the projection matrix learner may determine whether the projection matrix, the coefficient matrix, the error term, the first sub-coefficient matrix, and the second sub-coefficient matrix calculated in operations 1011 through 1016 satisfy the first convergence conditions. In detail, the projection matrix learner may determine whether a value of vector data obtained by subtracting vector data obtained by applying the dictionary to the coefficient matrix and vector data of the error term from vector data obtained by applying the projection matrix to the training vector data converges to "0". When the value of the vector data converges to "0", it may be determined that the conditions are satisfied. In another example, the projection matrix learner may determine whether a value of a matrix obtained by subtracting a product of the first sub-coefficient matrix and the second sub-coefficient matrix from the coefficient matrix converges to "0". When the value of the matrix converges to "0", it may be determined that the conditions are satisfied. The first convergence conditions may correspond to the constraints of Equation 10.

In response to the first convergence conditions not being satisfied, the projection matrix learner may return to operation 1011 to re-calculate the variables except for the dictionary until the first convergence conditions are satisfied. In response to the first convergence conditions being satisfied, the projection matrix learner may initiate an operation of calculating the dictionary as follows.

In operation 1021, the projection matrix learner may calculate the dictionary based on the training data set, the projection matrix, the error term, the parameters, and the coefficient matrix. For example, the projection matrix learner may calculate the dictionary based on Equation 24. The projection matrix learner may determine a ratio to maintain the dictionary in a previous iteration through a weight parameter.

In operation 1022, the projection matrix learner may determine whether the dictionary satisfies second convergence conditions. For example, the projection matrix learner may determine whether a difference between the dictionary in the previous iteration and a currently calculated dictionary converges to "0".

In a case in which the calculated dictionary does not satisfy the second convergence conditions, the projection matrix learner may return to operation 1010 to re-calculate the variables except for the dictionary. In a case in which the calculated dictionary satisfies the second convergence conditions, the projection matrix learner may determine that learning is completed, and store the calculated projection matrix having the fixed rank in a database to recognize an object appearing in an image.

Figure 11:
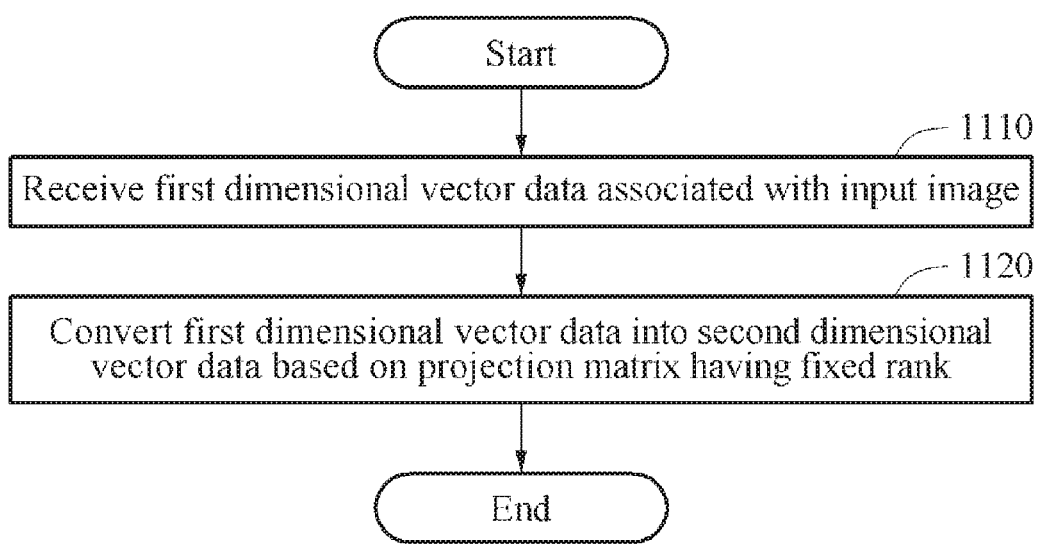
FIG. 11 is a flowchart illustrating a method of converting a vector corresponding to an input image according to at least one example embodiment.

FIG. 11 is a flowchart illustrating a method of converting a vector corresponding to an input image according to at least one example embodiment.

Referring to FIG. 11, in operation 1110, a vector receiver may receive first dimensional vector data associated with an input image. For example, the vector receiver may receive the first dimensional vector data associated with the input image including an object.

In operation 1120, a vector converter may convert the first dimensional vector data into second dimensional vector data based on a projection matrix having a fixed rank. Here, a first dimension of the first dimensional vector data may be higher than a second dimension of the second dimensional vector data.

The projection matrix and a dictionary may be learned by the method of FIGS. 9 and 10.

In an example, in operation 1110, the vector receiver may receive first image vector data associated with a first image and second image vector data associated with at least one second image. In this example, in operation 1120, the vector converter may convert the first image vector data and the second image vector data into second dimensional first image vector data and second dimensional second image vector data based on the projection matrix. A determiner may compare the first image and each of the at least one second image based on the second dimensional first image vector data and the second dimensional second image vector data.

Figure 12:
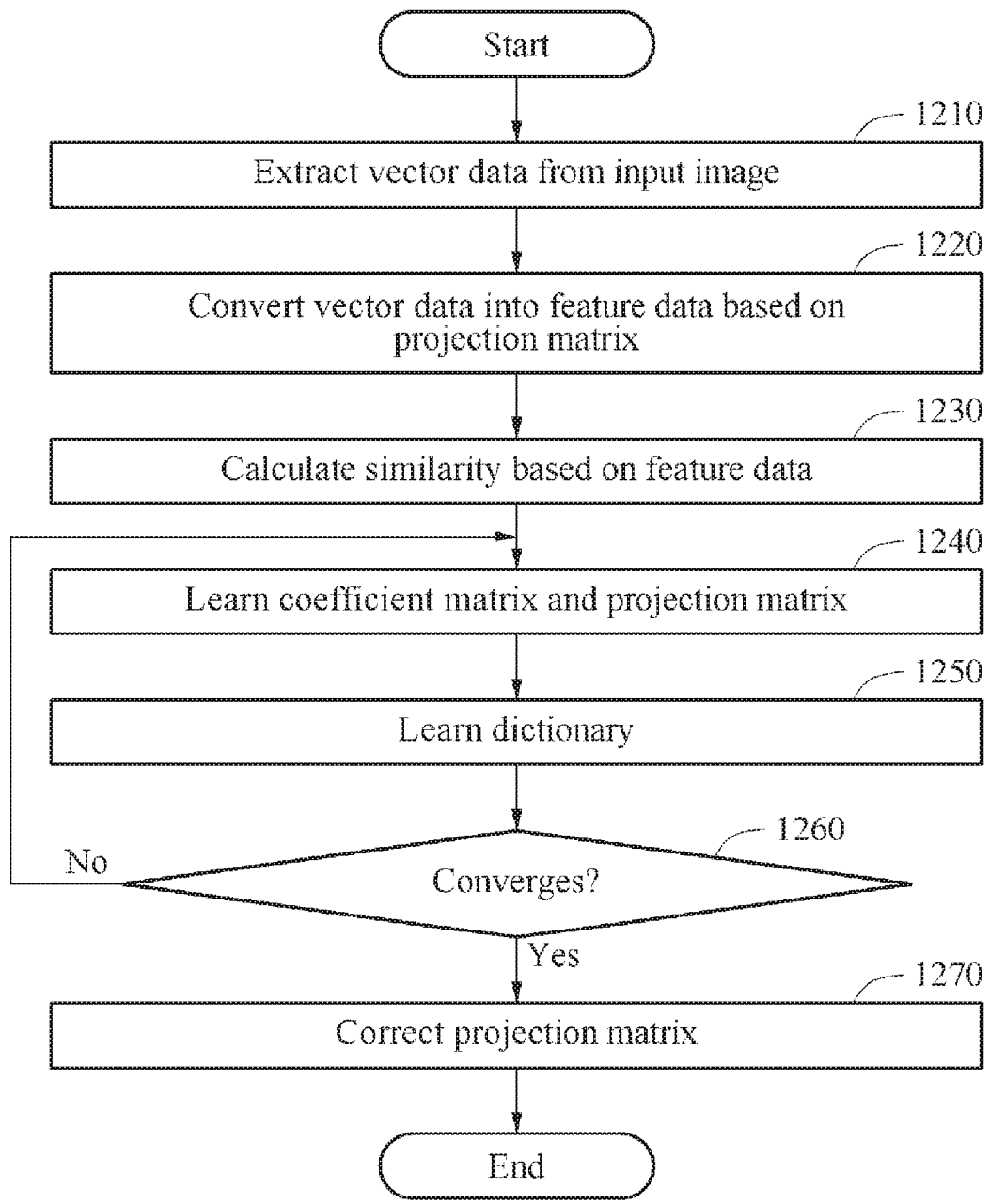
FIG. 12 is a flowchart illustrating a method of correcting a projection matrix based on an input image according to at least one example embodiment.

FIG. 12 is a flowchart illustrating a method of correcting a projection matrix based on an input image according to at least one example embodiment.

In an example, an image recognizing apparatus may recognize an input image based on the projection matrix and the average vector data calculated as described with reference to FIGS. 1 through 9. Further, the image recognizing apparatus may correct the projection matrix and the average vector data stored in a database based on the input image.

Referring to FIG. 12, in operation 1210, the image recognizing apparatus may extract vector data from an input image. For example, the image recognizing apparatus may extract the vector data associated with the input image, also referred to as, the input vector data, similar to the vector extractor 321 of FIG. 3.

In operation 1220, the image recognizing apparatus may convert the input vector data into feature data based on a projection matrix having a fixed rank. For example, the image recognizing apparatus may convert the input vector data into the feature data by applying the projection matrix to the input vector data, similar to the feature converter 322 of FIG. 3. Further, a recognition rate may improve when an average of the object is considered. Thus, the image recognizing apparatus may subtract average vector data from the input vector data, and apply the projection matrix to the average vector data-subtracted input vector data.

In operation 1230, the image recognizing apparatus may calculate a similarity based on the feature data. Here, when a similarity between the feature data corresponding to the input image, for example, input feature data, and registered feature data corresponding to a predetermined or, alternatively, desired label stored in the database is calculated to be greater than or equal to a threshold similarity, the image recognizing apparatus may map the corresponding label to input vector data of a currently received input image. The input vector data of the input image may be used as new training vector data. For example, the image recognizing apparatus may generate a training data set including the input vector data to which the label is mapped. The database may include a label designated with respect to at least one object, and at least one item of vector data mapped to the corresponding label.

In operation 1240, the image recognizing apparatus may learn a coefficient matrix and the projection matrix based on the input vector data of the input image. For example, similar to operation 1010 of FIG. 10, the image recognizing apparatus may learn the coefficient matrix and the projection matrix based on the training data set.

In operation 1250, the image recognizing apparatus may learn a dictionary based on the coefficient matrix and the projection matrix calculated in operation 1240. For example, similar to operations 1021 and 1022 of FIG. 10, the image recognizing apparatus may learn the dictionary.

In operation 1260, the image recognizing apparatus may determine whether the learned projection matrix and the learned dictionary converge. In a case in which the learned projection matrix and the learned dictionary do not converge, the image recognizing apparatus may return to operation 1240 to repeat the learning process. In a case in which the learned projection matrix and the learned dictionary converge, the image recognizing apparatus may correct the projection matrix, in operation 1270.

In operation 1270, the image recognizing apparatus may correct the projection matrix to be a newly learned projection matrix. The image recognizing apparatus may regenerate a projection matrix based on input vector data of an input image and a result of recognizing the input image, for example, a result of performing a comparison based on a similarity, each time a new input image is received.

In an example, the image recognizing apparatus may determine a rank of the projection matrix to be a fixed rank, thereby calculating the projection matrix without performing low-rank calculation with respect to the projection matrix. Thus, the image recognizing apparatus may regenerate the projection matrix relatively fast. The image recognizing apparatus may generate a projection matrix that is optimized for an individual user or, alternatively, set in a desirable manner for an individual user, by updating the projection matrix through the input image, and store the generated projection matrix in the database. Further, the image recognizing apparatus may regenerate average vector data by incorporating input vector data of an input image each time an input image is received. The image recognizing apparatus may recognize an object based on the regenerated projection matrix.

Figure 13:
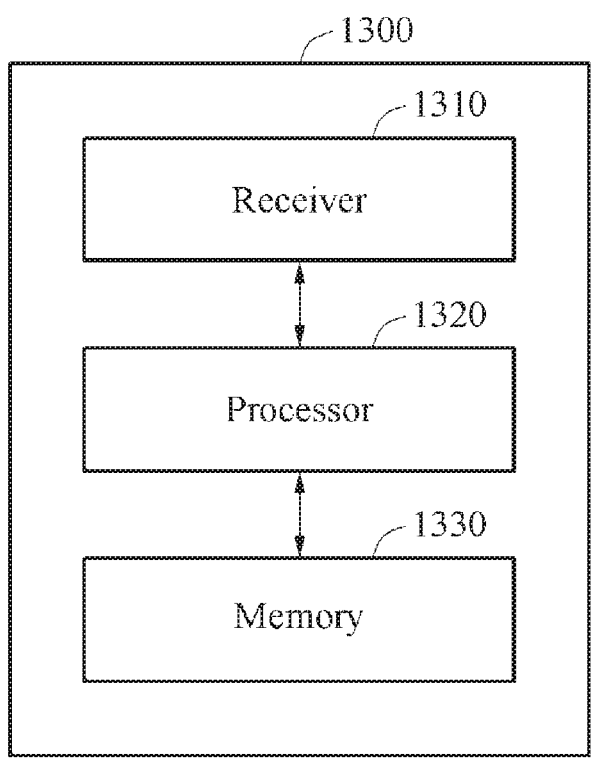
FIG. 13 is a block diagram illustrating a configuration of an apparatus for converting a vector corresponding to an input image, an apparatus for converting an input image into discriminative feature data, or an apparatus for learning a projection matrix according to at least one example embodiment.

FIG. 13 is a block diagram illustrating a configuration of an apparatus for converting a vector corresponding to an input image, an apparatus for converting an input image into discriminative feature data, or an apparatus for learning a projection matrix according to at least one example embodiment.

Referring to FIG. 13, an apparatus 1300 may include a receiver 1310, a processor 1320, and a memory 1330. For example, the apparatus 200 for converting an input image including an object into discriminative feature data of FIG. 2, the apparatus 720 of FIG. 7 for converting a vector corresponding to an input image, the apparatus 300 of FIG. 3 for converting an input image into discriminative feature data, and the apparatus 400 of FIG. 4 for learning a projection matrix, and the image recognizing apparatus of FIG. 12 may each be implemented or embodied by an apparatus having the structure and configuration of the apparatus 1300 of FIG. 13.

For example, in the apparatus 720 for converting a vector corresponding to an input image, the vector receiver 721 may correspond to the receiver 1310. According to at least some example embodiments, the receiver 1310 may be embodied as a circuit or circuitry configured to receive data. The vector converter 722 may be implemented as the processor 1320. The memory 1330 may store a projection matrix and average vector data in a database.

In another example, in the apparatus 300 for converting an input image including an object into discriminative feature data, the image receiver 310 may correspond to the receiver 1310. The object detector 311, the object normalizer 312, the vector extractor 321, the feature converter 322, and the determiner 330 may be implemented as the processor 1320.

In still another example, the apparatus 400 for learning a projection matrix to convert a dimension of input vector data associated with an input image, the training vector receiver 410 may correspond to the receiver 1310. The projection matrix learner 420 may be implemented as the processor 1320. Further, the memory 1330 may store a coefficient matrix, a first sub-coefficient matrix, a second sub-coefficient matrix, and a dictionary which need to be stored temporarily or semi-permanently in a learning process, or may store final results, for example, a projection matrix and average vector data, in a database.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media, for example, as program instructions, to implement various operations of the above-described example embodiments. The media may also include, alone or in combination with the program instructions, data files, data structures, and the like. According to at least some example embodiments, the program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of converting a vector corresponding to an input image, the method comprising:
   generating a projection matrix based on a covariance matrix corresponding to training vector data and a dictionary which is a set of elements constituting an object in an image, the generating including generating the projection matrix such that the projection matrix has a fixed rank;
   receiving input vector data associated with the input image including the object;
   converting the received input vector data into feature data based on the projection matrix having the fixed rank, wherein a first dimension of the input vector data is higher than a second dimension of the feature data; and
   recognizing the object using the feature data converted from the received input vector data based on the projection matrix.

2. The method of claim 1, wherein the converting comprises:
   determining average vector data-subtracted input vector data by subtracting average vector data from the input vector data, and applying the projection matrix having the fixed rank to the average vector data-subtracted input vector data.

3. The method of claim 1, wherein the projection matrix is generated such that feature data obtained by reflecting the projection matrix in the input vector data is to be the same as vector data obtained by adding a sparse error matrix to a product of a coefficient matrix and the dictionary.

4. The method of claim 3, wherein the projection matrix is generated based on metric calculation using the covariance matrix and a rank of the coefficient matrix.

5. The method of claim 1 wherein,
   the receiving includes receiving first image vector data associated with a first image and second image vector data associated with at least one second image,
   the converting includes converting the first image vector data and the second image vector data into second dimensional first image vector data and second dimensional second image vector data based on the projection matrix, and
   the method further comprises:
   comparing the first image and each of the at least one second image based on the second dimensional first image vector data and the second dimensional second image vector data.

6. The method of claim 1, wherein the receiving comprises:
   receiving the input image;
   detecting an object area including the object from the input image; and
   extracting the input vector data from the input image.

7. The method of claim 1, further comprising:
   determining a similarity by performing a comparison based on the feature data and feature data obtained by converting input vector data extracted from an image other than the input image; and
   determining that the object included in the input image is the same as an object included in the other image when the similarity is greater than a threshold similarity.

8. The method of claim 1, further comprising:
   determining a similarity by performing a comparison based on the feature data and stored feature data corresponding to a plurality of objects; and
   determining that the object included in the input image is the same as an object corresponding to feature data having a similarity greater than a threshold similarity, among the stored feature data.

9. A method of learning a projection matrix to convert a dimension of vector data associated with an input image, the method comprising:
   receiving training data sets corresponding to a plurality of training images, respectively;
   determining a fixed rank;
   after determining the fixed rank, jointly learning a first projection matrix having the fixed rank and a dictionary which is a set of elements constituting an object in an image, based on the training data sets, the learning of the first projection matrix including learning the first projection matrix such that the first projection matrix has the determined fixed rank; and
   recognizing an object of the input image using feature data, wherein the feature data is converted from input vector data associated with the input image based on the first projection matrix.

10. The method of claim 9, wherein the learning comprises maintaining a rank of the first projection matrix to be the fixed rank.

11. The method of claim 9, wherein the jointly learning comprises:
    generating the first projection matrix based on a covariance matrix corresponding to training vector data.

12. The method of claim 9, wherein the learning comprises:
    determining the first projection matrix such that a difference between elements corresponding to a same object is to be reduced and a difference between elements corresponding to different objects is to be increased in training vector data.

13. The method of claim 9, wherein the learning comprises:
    determining the first projection matrix such that vector data obtained by reflecting the first projection matrix in input vector data corresponding to an input image is to be the same as vector data obtained by adding a sparse error matrix to a product of a coefficient matrix and the dictionary.

14. The method of claim 13, wherein the learning comprises:
    determining the first projection matrix based on metric calculation using a covariance matrix and a rank of the coefficient matrix.

15. The method of claim 13, wherein the learning comprises:
    generating a convergent projection matrix and a convergent dictionary by iteratively determining the first projection matrix and the dictionary.

16. A method of recognizing an image, the method comprising:
    generating a first projection matrix such that the first projection matrix has a fixed rank;
    extracting first input vector data from a first input image;
    converting the first input vector data into first input feature data based on the first projection matrix having the fixed rank;
    generating a training data set including the first input vector data based on the first input feature data;
    learning a second projection matrix and a dictionary based on the generated training data set;
    correcting the first projection matrix based on the second projection matrix; and
    recognizing an object of a second image using second input feature data, wherein the second input feature data is converted from second input vector data associated with the second image based on the corrected first projection matrix.

17. The method of claim 16, wherein the learning comprises:
    determining a coefficient matrix and the second projection matrix based on the training data set;
    determining the dictionary based on the second projection matrix and the coefficient matrix; and
    iteratively determining the second projection matrix and the dictionary until the second projection matrix and the dictionary converge.

18. The method of claim 16, wherein the generating comprises:
    mapping a label corresponding to registered feature data stored in a database to the first input vector data when a similarity between the first input feature data and the registered feature data is greater than or equal to a threshold similarity; and
    generating the training data set including the first input vector data to which the label is mapped.

19. A non-transitory computer-readable medium comprising computer-readable instructions that, when executed by one or more processors, cause the one or more processors to perform the method of claim 1.

* * * * *